(12) United States Patent
Rephaeli et al.

(10) Patent No.: US 11,642,780 B2
(45) Date of Patent: *May 9, 2023

(54) MONITORING OF SURFACE TOUCH POINTS FOR PRECISION CLEANING

(71) Applicant: X Development LLC, Mountain View, CA (US)

(72) Inventors: Eden Rephaeli, Oakland, CA (US); Guy Satat, Sunnyvale, CA (US); Daniel Lam, Mountain View, CA (US); Benjamin Holson, Sunnyvale, CA (US); Jiajun Xu, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/382,561

(22) Filed: Jul. 22, 2021

(65) Prior Publication Data

US 2022/0193888 A1 Jun. 23, 2022

Related U.S. Application Data

(63) Continuation of application No. 17/131,252, filed on Dec. 22, 2020, now Pat. No. 11,097,414.

(51) Int. Cl.
*B25J 9/16* (2006.01)
*B25J 9/04* (2006.01)

(52) U.S. Cl.
CPC .............. *B25J 9/04* (2013.01); *B25J 9/163* (2013.01); *B25J 9/1615* (2013.01)

(58) Field of Classification Search
CPC ... B25J 9/04; B25J 9/1615; B25J 9/163; B25J 11/0085; B25J 9/1697; B25J 5/007;
(Continued)

(56) References Cited

U.S. PATENT DOCUMENTS 9,486,921 B1 11/2016 Straszheim et al.
10,025,308 B1* 7/2018 Poursohi .............. G06V 40/173
(Continued)

FOREIGN PATENT DOCUMENTS

| EP | 2769809 | 8/2014 |
|---|---|---|
| WO | 2019/203878 | 10/2019 |
| WO | 2020/152436 | 7/2020 |

OTHER PUBLICATIONS

Fu et al., Sensing Technology for Human Activity Recognition: A Comprehensive Survey, 2020, IEEE, p. 83791-83820 (Year: 2020).*
(Continued)

*Primary Examiner* — McDieunel Marc
(74) *Attorney, Agent, or Firm* — McDonnell Boehnen Hulbert & Berghoff LLP

(57) ABSTRACT

A system includes a robotic device, a sensor disposed on the robotic device, and circuitry configured to perform operations. The operations include determining a map that represents stationary features of an environment and receiving, from the sensor, sensor data representing the environment. The operations also include determining, based on the sensor data, a representation of an actor within the environment, where the representation includes keypoints representing corresponding body locations of the actor. The operations also include determining that a portion of a particular stationary feature is positioned within a threshold distance of a particular keypoint and, based on thereon, updating the map to indicate that the portion is to be cleaned. The operations further include, based on the map as updated, causing the robotic device to clean the portion of the particular stationary feature.

20 Claims, 11 Drawing Sheets

(58) Field of Classification Search
CPC ..... B25J 9/1679; G06V 20/20; G06V 40/107; G06V 2201/07; G05B 2219/40411
See application file for complete search history.

(56) References Cited

U.S. PATENT DOCUMENTS

| | | | | |
|---|---|---|---|---|
| 10,026,189 | B2* | 7/2018 | Byrne | G06T 7/20 |
| 10,471,591 | B1* | 11/2019 | Hinkle | B25J 9/1612 |
| 10,846,353 | B2* | 11/2020 | Rayanchu | G06Q 30/0261 |
| 11,097,414 | B1* | 8/2021 | Rephaeli | G06V 20/20 |
| 2016/0247370 | A1 | 8/2016 | Lamb et al. | |
| 2016/0288330 | A1 | 10/2016 | Konolige et al. | |
| 2018/0084242 | A1 | 3/2018 | Rublee et al. | |
| 2020/0118400 | A1 | 4/2020 | Zalewski et al. | |
| 2020/0171653 | A1 | 6/2020 | Holson et al. | |

OTHER PUBLICATIONS

Stommel et al., Model-Free Detection, Encoding, Retrieval, and Visualization of Human Poses From Kinect Data, 2014, IEEE, p. 865-875 (Year: 2014).*

Walter et al., Appearance-based object reacquisition for mobile manipulation, 2010, IEEE, p. 1-8 (Year: 2010).*

Tang et al., Fusion of local appearance with stereo depth for object tracking, 2008, IEEE, p. 1-8 (Year: 2008).*

Aalto University, "Bugs or dust? New method quickly reveals whether a surface is truly clean," PHYS.Org, Published on Mar. 6, 2019, retrieved Dec. 21, 2020 from https://phys.org/news/2019-03-bugs-method-quickly-revealssurface.html, 2 pages.

Ackerman, Evan, Swiss Startup Developing UV Disinfection Robot for Offices and Commercial Spaces, IEEE Spectrum, Published on May 20, 2020, downloaded on Dec. 21, 2020 from https://spectrum.ieee.org/automaton/robotics/industrial-robots/rovenso-uv-disinfection-robot, 3 pages.

Chen et al., "Vision-Based Finger Detection, Tracking, and Event Identification Techniques for Multi-Touch Sensing and Display Systems," Sensors, 2011, pp. 6868-6892, vol. 11, Published on Jul. 1, 2011, 25 Pages.

"CleanDet Solution at a Glance," retrieved Dec. 21, 2020 from http://juhakoivisto.com/cleandet/technology/, 7 pages.

Etherington, Darrell, "In effort to fight COVID-19, MIT robot gets to work disinfecting The Greater Boston Food Bank," TechCrunch, Published on Jun. 29, 2020, downloaded on Dec. 21, 2020 from https://techcrunch.com/2020/06/29/in-effort-to-fight-covid-19-mit-robot-gets-to-work-disinfecting-the-greater-boston-food-bank/, 9 pages.

Hithaishi CB, "SESTO HealthGUARD, the Autonomous Mobile Disinfectant Robot," BioSpectrum, Asia Edition, Published on Jun. 12, 2020, downloaded on Dec. 21, 2020 from https://www.biospectrumasia.com/opinion/46/16109/sesto-healthguard-the-autonomous-mobile-disinfectant-robot.html, 3 pages.

IMPublicationsOpen, "Is it clean? Hyperspectral imaging has the answer," downloaded on Dec. 21, 2020 from https://www.impopen.com/blog/it-clean-hyperspectral-imaging-has-answer, 6 pages.

Kahn, Jeremy, "Cleaning robots have their moment in the fight against COVID-19," Fortune, Published on Jun. 1, 2020, downloaded on Dec. 21, 2020 from https://fortune.com/2020/06/01/cleaning-robots-sales-soar-coronavirus-pandemic/, 4 pages.

Keutel, Sascha, "9 disinfection robots fighting the coronavirus," Tectales, Published on Aug. 6, 2020, downloaded on Dec. 21, 2020 from https://tectales.com/bionics-robotics/9-disinfection-robots-fighting-the-coronavirus.html, 19 pages.

Kjellström et al., "Tracking People Interacting with Objects," IEEE Conf. on Computer Vision and Pattern Recognition, CVPR, Published in Jun. 2010, downloaded on Dec. 21, 2020 from http://static.cs.brown.edu/people/mjblack/Papers/hedvigCVPR10.pdf, 8 pages.

Metz, Rachel, "Thermal Camera Turns Many Things into Interactive Surfaces," MIT Technology Review, Published on Jun. 13, 2014, downloaded on Dec. 21, 2020 from https://www.technologyreview.com/2014/06/13/172534/thermal-camera-turns-many-things-into-interactive-surfaces/, 10 pages.

Midopt, Midwest Optical Systems, Inc., "Ultraviolet Imaging," downloaded on Dec. 21, 2020 from https://midopt.com/solutions/monochrome-imaging/ultraviolet-imaging/, 2 pages.

Murray, Adrienne, "Coronavirus: Robots use light beams to zap hospital viruses," BBC News Services, Published on Mar. 20, 2020, downloaded on Dec. 21, 2020 from https://www.bbc.com/news/business-51914722, 10 pages.

Nanyang Technological University, "NTU Singapore researchers build disinfection robot to aid cleaners in COVID-19 outbreak," News Release, Published on Apr. 14, 2020, downloaded on Dec. 21, 2020 from https://www.eurekalert.org/pub_releases/2020-04/ntu-nsr041420.php, 4 pages.

Novus Light Technologies Today, "Otsaw Launches UV-C LED Disinfection Autonomous Robot," Published on Jun. 16, 2020, downloaded on Dec. 21, 2020 from https://www.novuslight.com/otsaw-launches-uv-c-led-disinfection-autonomous-robot_N10587.html, 3 pages.

Peterson, Hayley, "Amazon built a roving robot covered in UV light bulbs that could kill the coronavirus in warehouses and Whole Foods stores" Business Insider, Published on May 11, 2020, downloaded on Dec. 21, 2020 from https://www.businessinsider.com/amazon-builds-uv-light-robot-to-kill-coronavirus-on-surfaces-2020-5, 10 pages.

Purtill, Corinne, "Meet Violet, the Robot that Can Kill the COVID-19 Virus," Time, Published on Apr. 24, 2020, downloaded on Dec. 21, 2020 from https://time.com/5825860/coronavirus-robot/, 7 pages.

Ramalingam et al., "Vision-Based Dirt Detection and Adaptive Tiling Scheme for Selective Area Coverage," Hindawai, Journal of Sensors, vol. 2018, Article ID 3034128, Published on Dec. 30, 2018, downloaded on Dec. 21, 2020 from https://www.hindawi.com/journals/js/2018/3035128/, 25 pages.

Richards, Austin, "UV imaging opens new applications," Vision Systems Design, Published on Jul. 1, 2006, downloaded on Dec. 21, 2020 from https://www.vision-systems.com/non-factory/life-sciences/article/16736672/uv-imaging-opens-new-applications, 15 pages.

Rosa et al., "Semantic Place Understanding for Human-Robot Coexistence—Toward Intelligent Workplaces," IEEE Transactions on Human-Machine Systems, Apr. 2019, pp. 160-170, vol. 49, No. 2.

Stommel et al., "Model-Free Detection, Encoding, Retrieval, and Visualization of Human Poses From Kinect Data," IEEE/ASME Transactions on Mechatronics, Apr. 2015, pp. 865-875, vol. 20, No. 2.

The Institute's Editorial Staff, "Robotic Arm Wields UV Light Wand to Disinfect Public Spaces," IEEE Spectrum, Published on Apr. 28, 2020, downloaded on Dec. 21, 2020 from https://spectrum.ieee.org/news-from-around-ieee/the-institute/ieee-member-news/usc-researchers-robotic-arm-disinfect-coronavirus, 3 pages.

"UV light solutions deployed in fight against Covid-19," ElectroOptics, Published on Mar. 20, 2020, downloaded on Dec. 21, 2020 from https://www.electrooptics.com/news/uv-light-solutions-deployed-fight-against-covid-19, 4 pages.

Walter et al., "Appearance-based Object Reacquisition for Mobile Manipulation," IEEE, 2010, pp. 1-8.

Williams, Bethanni, "UofL researchers developing robot to clean, disinfect areas where risk of coronavirus exposure exists," WHAS11.com, Published on Apr. 28, 2020, downloaded on Dec. 21, 2020 from https://www.whas11.com/article/news/local/uofl-researchers-robot-clean-coronavirus/417-8ee34a75-ca95-4952-9a28-13de4ea03c89, 3 pages.

Wu et al., "EagleSense: Tracking People and Devices in Interactive Spaces using Real-Time Top-View Depth-Sensing," CHI 2017, Published on May 6, 2017, Denver, CO, USA, ACM, 2017, 14 pages.

Xenex Germ-Zapping Solutions, "Destroy Deadly Pathogens to Improve Safety & Peace of Mind, Deactivate SARS-CoV-2,mrsa, C. diff, VRE and other pathogen," downloaded on Dec. 21, 2020 from https://xenex.com, 10 pages.

Xiao et al., "DIRECT: Making Touch Tracking on Ordinary Surfaces Practical with Hybrid Depth-Infrared Sensing," ISS 16, Nov. 6-9, 2016, Niagara Falls, ON, Canada, ACM 2016, 10 pages.

(56) References Cited

OTHER PUBLICATIONS

International Searching Authority, International Search Report and Written Opinion dated Jan. 27, 2022, issued in connection with International Patent Application No. PCT/US2021/071688, filed on Oct. 1, 2021, 16 pages.

* cited by examiner

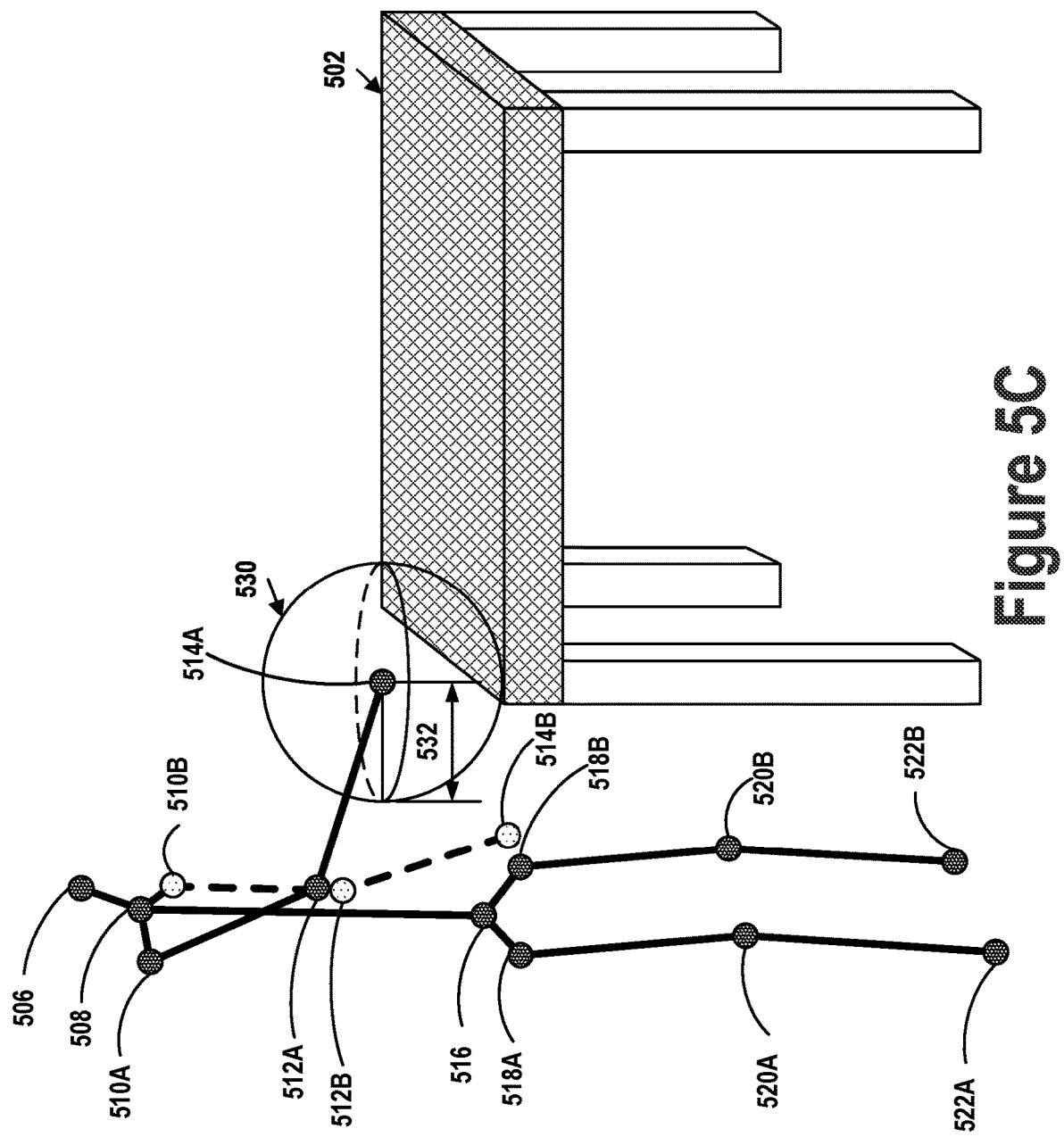

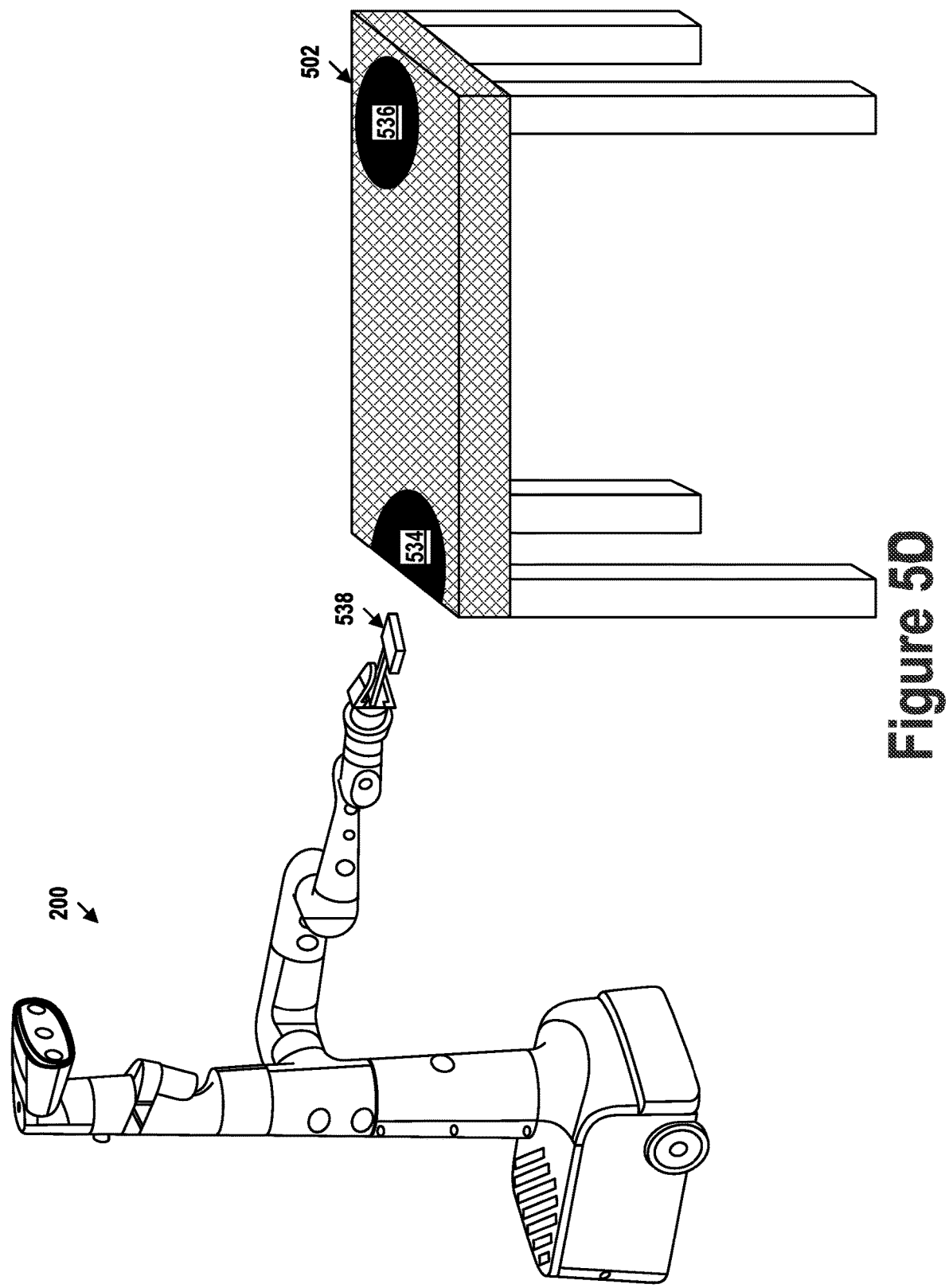

MONITORING OF SURFACE TOUCH POINTS FOR PRECISION CLEANING

CROSS-REFERENCE TO RELATED APPLICATION

The present application is a continuation application of U.S. patent application Ser. No. 17/131,252 filed on Dec. 22, 2020 and titled "Monitoring of Surface Touch Points for Precision Cleaning," which is herein incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

A robot may be used to identify and clean surfaces that have been touched by an actor, such as a human, a dog, a cat, or another robot. A control system may receive, from sensors on the robot, sensor data that represents the actor operating in the environment. The control system may determine a representation of the actor by generating, based on the sensor data, a plurality of keypoints that represent corresponding body locations of the actor, such as fingers, hands, elbows, and so on. Based on the positions of at least some of these keypoints, the control system may determine whether the actor has touched a feature in the environment. Specifically, the control system may determine whether any of the features in the environment have come within a threshold distance of at least one particular keypoint (e.g., a hand keypoint) of these keypoints. When a portion of a feature of the environment is positioned within the threshold distance of the particular keypoint, the portion may be designated for cleaning, and a map of the environment may be updated to indicate that the portion is to be cleaned. Once the actor moves to a different portion of the environment, the robot may, based on the map, clean any portions of the environment that have been designated for cleaning. Once a portion is cleaned, the map may again be updated to indicate that the portion has been cleaned.

In a first example embodiment, a system may include a robotic device, a sensor disposed on the robotic device, and circuitry configured to perform operations. The operations may include determining a map that represents a plurality of stationary features of an environment and receiving, from the sensor, sensor data representing the environment. The operations may also include determining, based on the sensor data, a representation of an actor within the environment. The representation may include a plurality of keypoints representing corresponding body locations of the actor. The operations may additionally include determining that a portion of a particular stationary feature of the plurality of stationary features of the environment is positioned within a threshold distance of a particular keypoint of the plurality of keypoints. The operations may further include, based on determining that the particular keypoint is positioned within the threshold distance of the portion of the particular stationary feature, updating the map to indicate that the portion of the particular stationary feature is to be cleaned. The operations may yet further include, based on the map as updated, causing the robotic device to clean the portion of the particular stationary feature.

In a second example embodiment, a computer-implemented method may include determining a map that represents a plurality of stationary features of an environment and receiving, from a sensor disposed on a robotic device, sensor data representing the environment. The computer-implemented method may also include determining, based on the sensor data, a representation of an actor within the environment. The representation may include a plurality of keypoints representing corresponding body locations of the actor. The computer-implemented method may additionally include determining that a portion of a particular stationary feature of the plurality of stationary features of the environment is positioned within a threshold distance of a particular keypoint of the plurality of keypoints. The computer-implemented method may further include, based on determining that the particular keypoint is positioned within the threshold distance of the portion of the particular stationary feature, updating the map to indicate that the portion of the particular stationary feature is to be cleaned. The computer-implemented method may yet further include, based on the map as updated, causing the robotic device to clean the portion of the particular stationary feature.

In a third example embodiment, a non-transitory computer-readable medium may have stored thereon instructions that, when executed by a computing device, cause the computing device to perform operations. The operations may include determining a map that represents a plurality of stationary features of an environment, and receiving, from a sensor disposed on a robotic device, sensor data representing the environment. The operations may also include determining, based on the sensor data, a representation of an actor within the environment. The representation may include a plurality of keypoints representing corresponding body locations of the actor. The operations may additionally include determining that a portion of a particular stationary feature of the plurality of stationary features of the environment is positioned within a threshold distance of a particular keypoint of the plurality of keypoints. The operations may further include, based on determining that the particular keypoint is positioned within the threshold distance of the portion of the particular stationary feature, updating the map to indicate that the portion of the particular stationary feature is to be cleaned. The operations may yet further include, based on the map as updated, causing the robotic device to clean the portion of the particular stationary feature.

In a fourth example embodiment, a system may include means for determining a map that represents a plurality of stationary features of an environment and means for receiving, from a sensor disposed on a robotic device, sensor data representing the environment. The system may also include means for determining, based on the sensor data, a representation of an actor within the environment. The representation may include a plurality of keypoints representing corresponding body locations of the actor. The system may additionally include means for determining that a portion of a particular stationary feature of the plurality of stationary features of the environment is positioned within a threshold distance of a particular keypoint of the plurality of keypoints. The system may further include means for, based on determining that the particular keypoint is positioned within the threshold distance of the portion of the particular stationary feature, updating the map to indicate that the portion of the particular stationary feature is to be cleaned. The system may yet further include means for, based on the map as updated, causing the robotic device to clean the portion of the particular stationary feature.

In a fifth example embodiment, a system may include a sensor and circuitry configured to perform operations. The operations may include determining a map that represents a plurality of stationary features of an environment, and receiving, from the sensor, sensor data representing the environment. The operations may also include determining, based on the sensor data, a representation of an actor within the environment. The representation may include a plurality of keypoints representing corresponding body locations of the actor. The operations may additionally include determining that a portion of a particular stationary feature of the plurality of stationary features of the environment is positioned within a threshold distance of a particular keypoint of the plurality of keypoints. The operations may further include, based on determining that the particular keypoint is positioned within the threshold distance of the portion of the particular stationary feature, updating the map to indicate that the portion of the particular stationary feature is determined to have been touched. The operations may yet further include, based on the map as updated, displaying a visual representation indicating that the portion of the particular stationary feature is determined to have been touched.

In a sixth example embodiment, a computer-implemented method may include determining a map that represents a plurality of stationary features of an environment, and receiving, from a sensor, sensor data representing the environment. The computer-implemented method may also include determining, based on the sensor data, a representation of an actor within the environment. The representation may include a plurality of keypoints representing corresponding body locations of the actor. The computer-implemented method may additionally include determining that a portion of a particular stationary feature of the plurality of stationary features of the environment is positioned within a threshold distance of a particular keypoint of the plurality of keypoints. The computer-implemented method may further include, based on determining that the particular keypoint is positioned within the threshold distance of the portion of the particular stationary feature, updating the map to indicate that the portion of the particular stationary feature is determined to have been touched. The computer-implemented method may yet further include, based on the map as updated, displaying a visual representation indicating that the portion of the particular stationary feature is determined to have been touched.

In a seventh example embodiment, a non-transitory computer-readable medium may have stored thereon instructions that, when executed by a computing device, cause the computing device to perform operations. The operations may include determining a map that represents a plurality of stationary features of an environment, and receiving, from a sensor, sensor data representing the environment. The operations may also include determining, based on the sensor data, a representation of an actor within the environment. The representation may include a plurality of keypoints representing corresponding body locations of the actor. The operations may additionally include determining that a portion of a particular stationary feature of the plurality of stationary features of the environment is positioned within a threshold distance of a particular keypoint of the plurality of keypoints. The operations may further include, based on determining that the particular keypoint is positioned within the threshold distance of the portion of the particular stationary feature, updating the map to indicate that the portion of the particular stationary feature is determined to have been touched. The operations may yet further include, based on the map as updated, displaying a visual representation indicating that the portion of the particular stationary feature is determined to have been touched.

In an eighth example embodiment, a system may include means for determining a map that represents a plurality of stationary features of an environment, and means for receiving, from the sensor, sensor data representing the environment. The system may also include means for determining, based on the sensor data, a representation of an actor within the environment. The representation may include a plurality of keypoints representing corresponding body locations of the actor. The system may additionally include means for determining that a portion of a particular stationary feature of the plurality of stationary features of the environment is positioned within a threshold distance of a particular keypoint of the plurality of keypoints. The system may further include means for, based on determining that the particular keypoint is positioned within the threshold distance of the portion of the particular stationary feature, updating the map to indicate that the portion of the particular stationary feature is determined to have been touched. The system may yet further include means for, based on the map as updated, displaying a visual representation indicating that the portion of the particular stationary feature is determined to have been touched.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5C illustrates a threshold distance around a keypoint, in accordance with example embodiments.

FIG. 5D illustrates portions of an environment designated for cleaning, in accordance with example embodiments.

DETAILED DESCRIPTION

Figure 1:
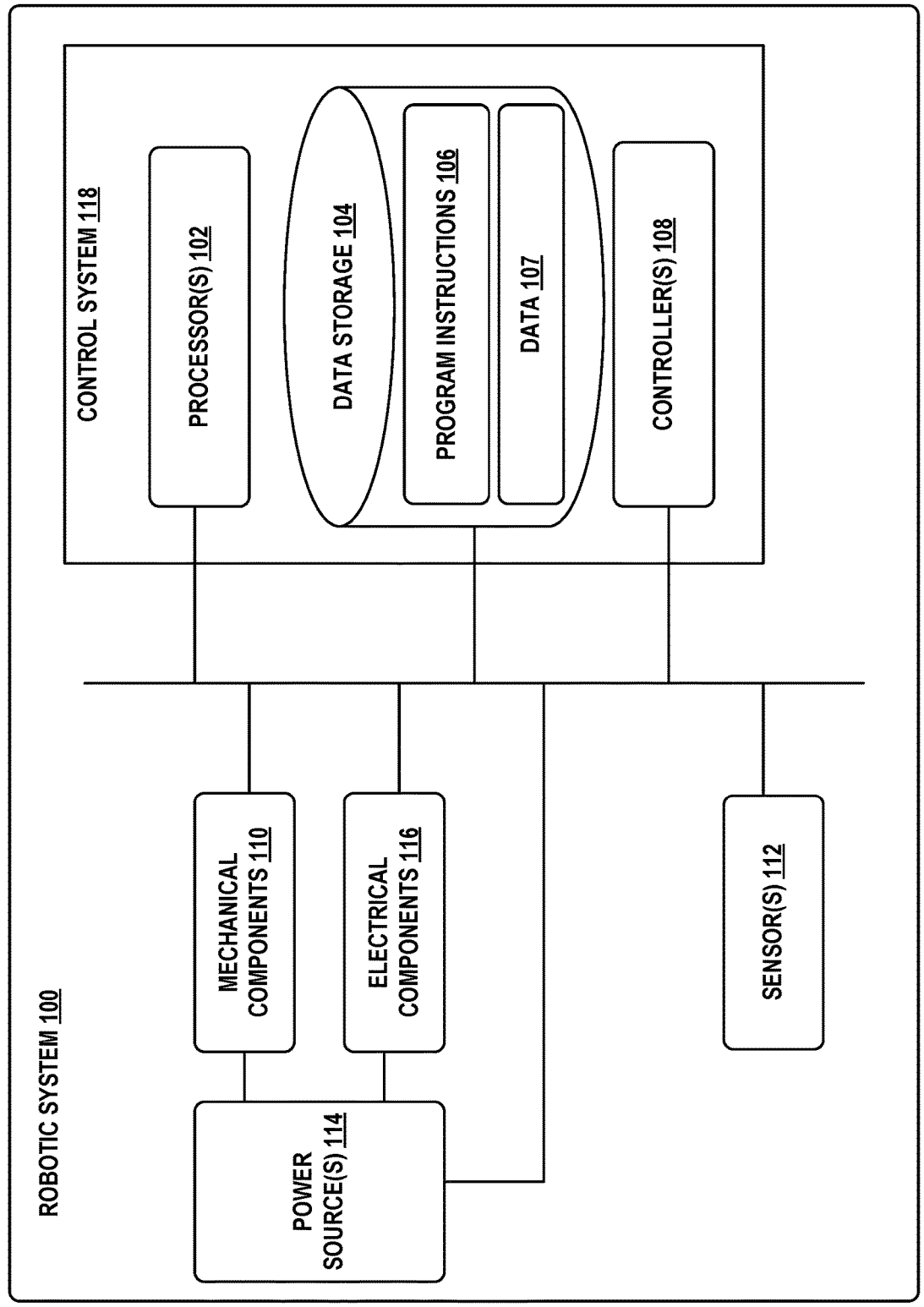
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A robotic device may be configured to detect and/or clean surfaces within an environment that have been touched by actors. Specifically, the robotic device may be mobile and thus configured to traverse the environment. The robotic device may include thereon one or more sensors configured to generate sensor data that represents stationary features, such as the ground surface, walls, and/or furniture, as well as (non-stationary) actors, such as humans, animals, and/or other robotic devices. The one or more sensors may include, for example, a red-green-blue (RGB) two-dimensional (2D) camera, a depth (three-dimensional (3D)) camera, a light detection and ranging (LIDAR) device, a radio detection and ranging (RADAR) device, a time of flight (ToF) camera, a thermal camera, and/or a near-infrared camera, among other possibilities. The sensor data may be collected while the robotic device performs various tasks within the environment, and/or as part of a dedicated data-gathering operation.

Control circuitry (e.g., forming part of a control system) may be configured to receive the sensor data, process the sensor data, and issue commands to the robotic device to perform various operations within the environment. The control circuitry may be physically located on the robotic device and/or remotely from the robotic device. Specifically, the control circuitry may be configured to generate a map that represents at least the stationary features of the environment. The map may be generated based on sensor data obtained from the robotic device, from one or more other robotic devices operating in the environment, and/or one or more sensors distributed throughout the environment. A subset of these stationary features may be classified as common-touch/high-touch features that are determined to be interacted with by actors at a relatively high frequency, and may thus be monitored by the robotic device to determine whether these features have been touched.

In order to determine whether a stationary feature has been touched by an actor, the robotic device may receive, from the one or more sensors, sensor data that represents the actor within the environment. The control circuitry may be configured to determine a representation of the actor based on the sensor data. Specifically, the representation may include a plurality of keypoints representing body locations of the actor. For example, the keypoints may represent anatomical locations, such as joints, of a body of the actor, and may thus represent the ankles, knees, hips, shoulders, elbows, wrists, neck, and/or head. In some cases, the keypoints may be interconnected to define a skeleton representing the body of the actor. The keypoint may be determined, for example, by way of a machine learning model, such as a convolutional neural network (CNN).

The control circuitry may be further configured to determine, for a particular keypoints of the plurality of keypoints, whether any portions of the stationary features are positioned within a threshold distance of the particular keypoint. To that end, the control circuitry may be configured to transform the keypoints from a reference frame of the sensor data to a reference frame of the map. The particular keypoint may represent a body location that is frequently used to interact with the environment, such as an arm, a hand, and/or a finger. In some cases, the control circuitry may determine that a portion of a particular stationary feature, such as a table top, is positioned within the threshold distance of the particular keypoint. Based on this determination, the control circuitry may be configured to update the map to indicate that the portion of the particular stationary feature is to be cleaned.

Specifically, the map may be updated to indicate that the portion of the particular stationary feature is determined/estimated to have been touched. The determination/estimation that the portion has been touched may include cases where the portion was, in fact, touched, as well as cases where the portion was not actually touched but appears to have been touched based on the position of the particular keypoint. For example, a subset of the map that represents the portion of the table top falling within the threshold distance of the particular keypoint may be marked as "touched" by updating one or more values (e.g., touched/untouched flags) in a data structure that represents the map.

In some cases, the map may represent the environment as a plurality of voxels. Each voxel may be marked either as occupied by a stationary feature or as unoccupied (e.g., representing empty space). Thus, the control circuitry may be configured to identify occupied voxels that fall within the threshold distance of the particular keypoint, and mark these voxels for cleaning (e.g., mark these voxels as touched). In other cases, the map may represent the features of the environment as a polygon mesh that includes vertices, edges, and faces. Thus, the control circuitry may be configured to identify faces, vertices, and/or edges represented by the mesh that fall within the threshold distance of the particular keypoint, and mark these faces, vertices, and/or edges for cleaning. Other arrangements of the map are possible.

The sensor data may include a plurality of sensor data frames representing the actor at various points in time. Thus, as the actor interacts with various features of the environment, interactions determined to involve the actor touching features of the environment may be detected by the control circuitry and indicated by updating the map. The map may thus store a representation of the portions of the environment determined to have been touched by the actor during a particular period of time. When the actor leaves the relevant portion of the environment, the robotic device may be used to clean (e.g., sanitize, disinfect, sterilize, and/or otherwise tidy-up) the portions of the environment determined to have been touched. Such cleaning may include cleaning of portions that have, in fact, been touched, as well as portions that appear to have been touched, but that were not actually touched. Once the robot cleans these portions, the map may again be updated to indicate that the portions have been cleaned, and are thus "untouched."

In some implementations, in addition to determining whether the particular stationary feature is located within the threshold distance of the particular keypoint, the control circuitry may be configured to detect and/or verify touching of the particular stationary feature based on a pose of the actor indicated by the plurality of keypoints, and/or a motion pattern of the actor indicated by changes in the positions of the plurality of keypoints over time. A machine learning model, such as a feed-forward artificial neural network (FF-ANN), may be configured to determine that a particular arrangement of the plurality of keypoints indicates that the actor is engaged and/or making physical contact with the particular stationary feature. For example, an arrangement of the plurality of keypoints indicating that the actor is facing a table may be indicative of engagement with the table, while another arrangement of the plurality of keypoints indicating that the actor is walking alongside an edge of the table may be indicative of a lack of engagement and/or physical contact with the table. Another machine learning model, such as a recurrent neural network (RNN) or a long-short term memory (LSTM) neural network, may be configured to make a similar determination of engagement and/or physical contact with the table based on a plurality of sets of the keypoints corresponding to different points in time.

In some cases, the sensor data used to identify touched features may additionally include sensor data collected by one or more other robots within the environment, and/or sensors installed throughout the environment (e.g., security cameras). By sourcing sensor data from multiple robots and/or sensors installed within the environment, more touch points may be detected, and/or the detection thereof may be more accurate due to actors being observed from additional points of view. For example, keypoints may be determined more accurately due to a more complete representation of the actor by the sensor data.

In some cases, the particular keypoint on the actor may be occluded due to positioning of the robotic device relative to the actor when the sensor data is captured. For example, the robotic device may be positioned behind the actor, and might thus be unable to see the hands of the actor positioned in front of the actor. Thus, the control circuitry may be configured to estimate the positions of one or more occluded keypoints based on the positions of other visible keypoints. Since the estimated position of a keypoint corresponding to an occluded body location may be less accurate than an estimated position of the keypoint if the body location was not occluded, the threshold distance used to detect touched surfaces may be increased. For example, the threshold distance may range from a minimum threshold distance associated with a high-confidence estimated position of the particular keypoint (e.g., when completely visible) to a maximum threshold distance associated with a low-confidence estimated position of the particular keypoint (e.g., when completely occluded). Additionally or alternatively, one or more other keypoints may be used to detect touched features when the particular keypoint is occluded. For example, when a hand is occluded, keypoints on the arm (e.g., elbow) may instead be used to determine whether a particular feature has been touched, based on these keypoint coming within a different (e.g., larger) threshold distance of the particular feature.

The approach described above for identifying and cleaning touched surfaces provides several advantages. Specifically, the robotic device may be able to accurately identify and clean portions of the environment that have actually and/or likely been touched, rather than indiscriminately cleaning all portions of the environment that could have potentially been touched. This allows the robotic device to reduce and/or minimize the use of cleaning products, and reduces and/or minimizes the total cleaning time. Further, the robotic device may be able to reduce and/or minimize the time between a surface being touched and the surface being cleaned. That is, rather than performing a general cleaning periodically (e.g., once per day, once per week, etc.), the robotic device may be able to clean the surface when the actor that has touched the surface moves sufficiently far away from the surface to allow the robot to safely operate in the relevant portion of the environment (and before another actor touches the surface). Additionally, since the robotic device might not need to abide by social distancing rules, the robotic device might be able to perform the cleaning faster and with fewer spatial restrictions than a human would be able to.

II. EXAMPLE ROBOTIC SYSTEMS

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, and/or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including by way of wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106 and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired and/or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm and end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
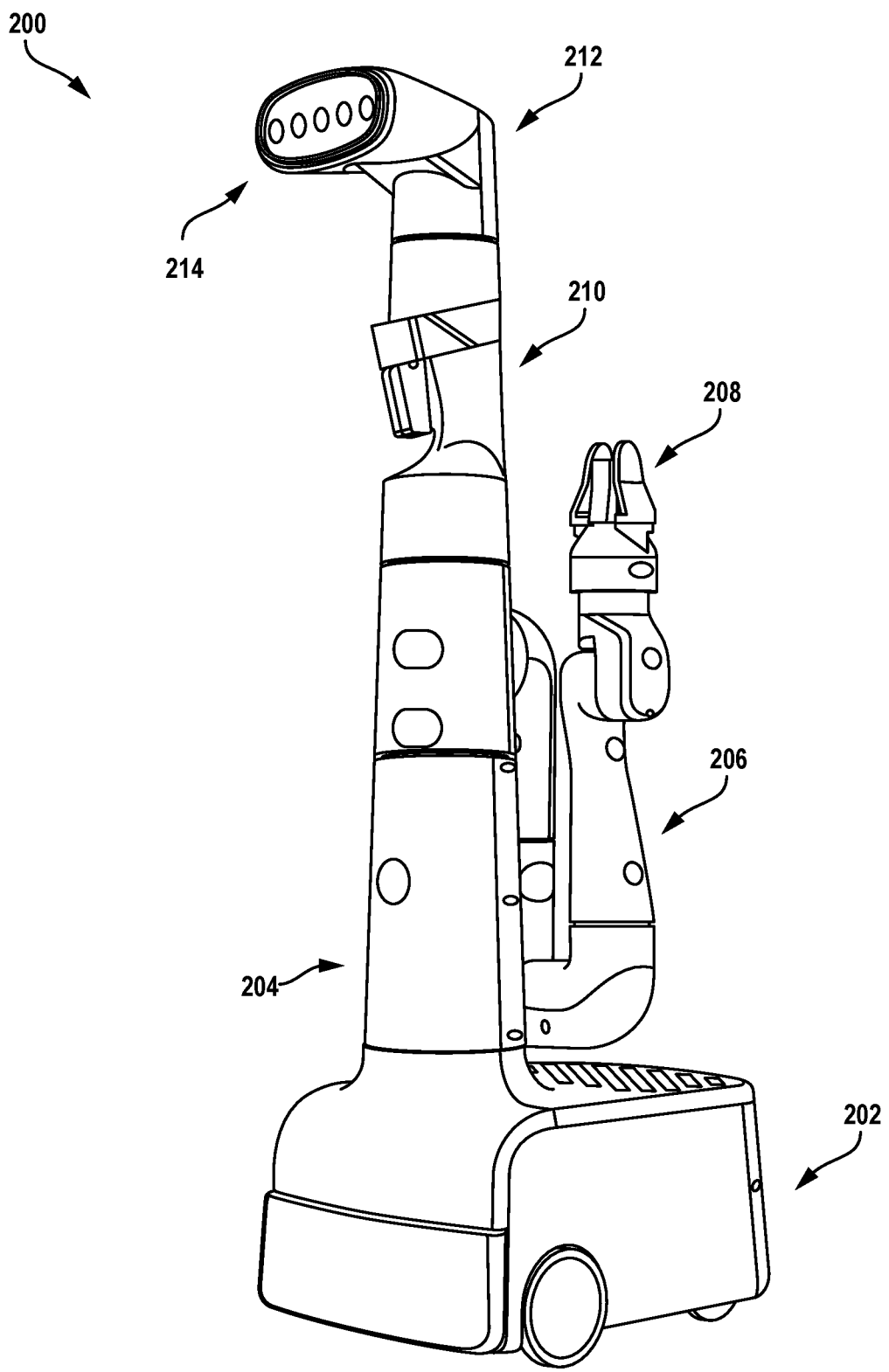
FIG. 2 illustrates a mobile robot, in accordance with example embodiments.
Figure 3:
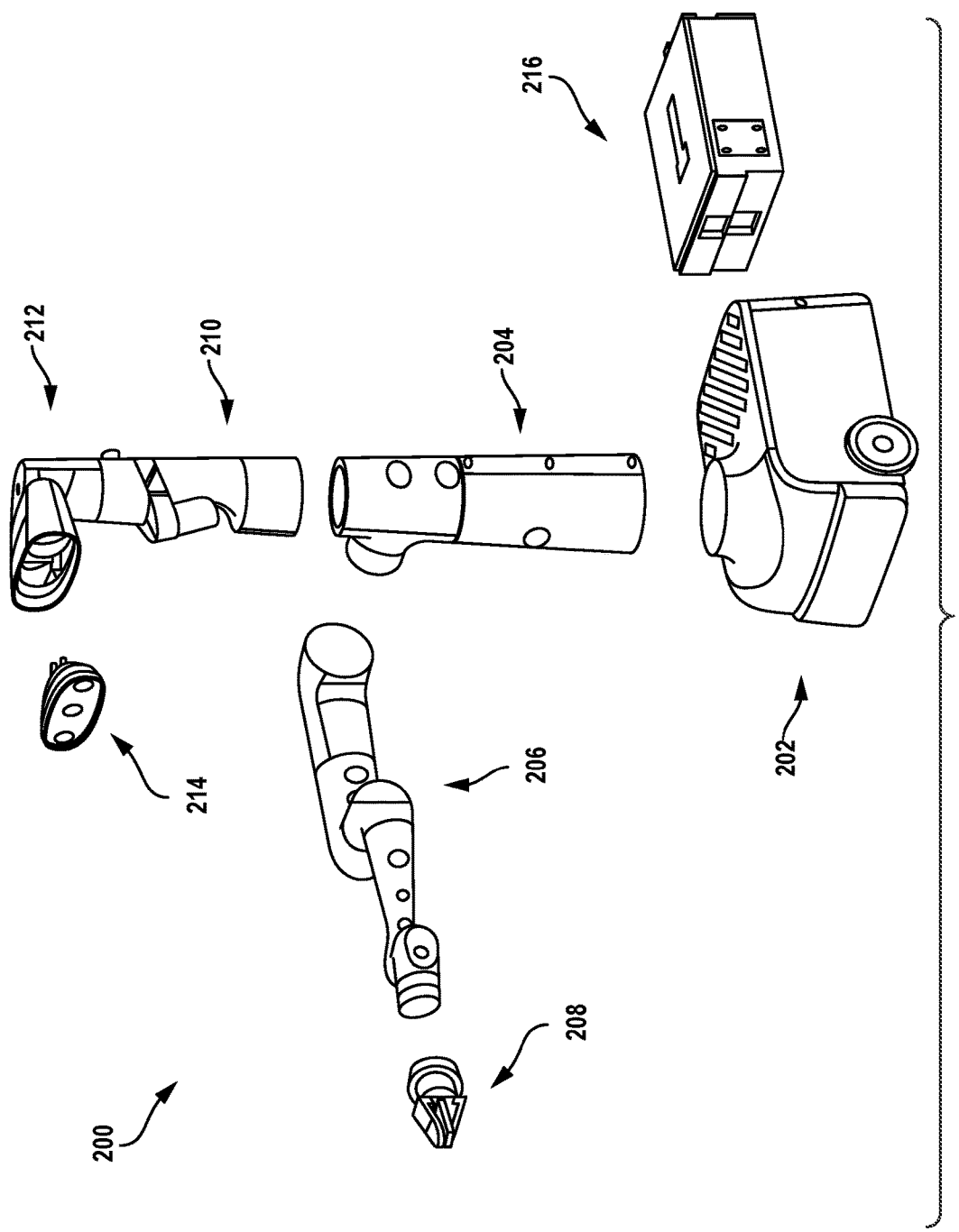
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, robot 200 may include mobile base 202, midsection 204, arm 206, end-of-arm system (EOAS) 208, mast 210, perception housing 212, and perception suite 214. Robot 200 may also include compute box 216 stored within mobile base 202.

Mobile base 202 includes two drive wheels positioned at a front end of robot 200 in order to provide locomotion to robot 200. Mobile base 202 also includes additional casters (not shown) to facilitate motion of mobile base 202 over a ground surface. Mobile base 202 may have a modular architecture that allows compute box 216 to be easily removed. Compute box 216 may serve as a removable control system for robot 200 (rather than a mechanically integrated control system). After removing external shells, compute box 216 can be easily removed and/or replaced. Mobile base 202 may also be designed to allow for additional modularity. For example, mobile base 202 may also be designed so that a power system, a battery, and/or external bumpers can all be easily removed and/or replaced.

Midsection 204 may be attached to mobile base 202 at a front end of mobile base 202. Midsection 204 includes a mounting column which is fixed to mobile base 202. Midsection 204 additionally includes a rotational joint for arm 206. More specifically, Midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide arm 206 with sufficient height to perform manipulation tasks at commonly encountered height levels (e.g., coffee table top and/or counter top levels). The length of the mounting column of midsection 204 may also allow the shoulder pitch J1 joint to rotate arm 206 over mobile base 202 without contacting mobile base 202.

Arm 206 may be a 7DOF robotic arm when connected to midsection 204. As noted, the first two DOFs of arm 206 may be included in midsection 204. The remaining five DOFs may be included in a standalone section of arm 206 as illustrated in FIGS. 2 and 3. Arm 206 may be made up of plastic monolithic link structures. Inside arm 206 may be housed standalone actuator modules, local motor drivers, and thru bore cabling.

EOAS 208 may be an end effector at the end of arm 206. EOAS 208 may allow robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

Mast 210 may be a relatively long, narrow component between the shoulder yaw J0 joint for arm 206 and perception housing 212. Mast 210 may be part of the stacked tower at the front of mobile base 202. Mast 210 may be fixed relative to mobile base 202. Mast 210 may be coaxial with midsection 204. The length of mast 210 may facilitate perception by perception suite 214 of objects being manipulated by EOAS 208. Mast 210 may have a length such that when the shoulder pitch J1 joint is rotated vertical up, a topmost point of a bicep of arm 206 is approximately aligned with a top of mast 210. The length of mast 210 may then be sufficient to prevent a collision between perception housing 212 and arm 206 when the shoulder pitch J1 joint is rotated vertical up.

As shown in FIGS. 2 and 3, mast 210 may include a 3D lidar sensor configured to collect depth information about the environment. The 3D lidar sensor may be coupled to a carved-out portion of mast 210 and fixed at a downward angle. The lidar position may be optimized for localization, navigation, and for front cliff detection.

Perception housing 212 may include at least one sensor making up perception suite 214. Perception housing 212 may be connected to a pan/tilt control to allow for reorienting of perception housing 212 (e.g., to view objects being manipulated by EOAS 208). Perception housing 212 may be a part of the stacked tower fixed to mobile base 202. A rear portion of perception housing 212 may be coaxial with mast 210.

Perception suite 214 may include a suite of sensors configured to collect sensor data representative of the environment of robot 200. Perception suite 214 may include an infrared (IR)-assisted stereo depth sensor. Perception suite 214 may additionally include a wide-angled red-green-blue (RGB) camera for human-robot interaction and context information. Perception suite 214 may additionally include a high resolution RGB camera for object classification. A face light ring surrounding perception suite 214 may also be included for improved human-robot interaction and scene illumination. In some examples, perception suite 214 may also include a projector configured to project images and/or video into the environment.

Figure 4:
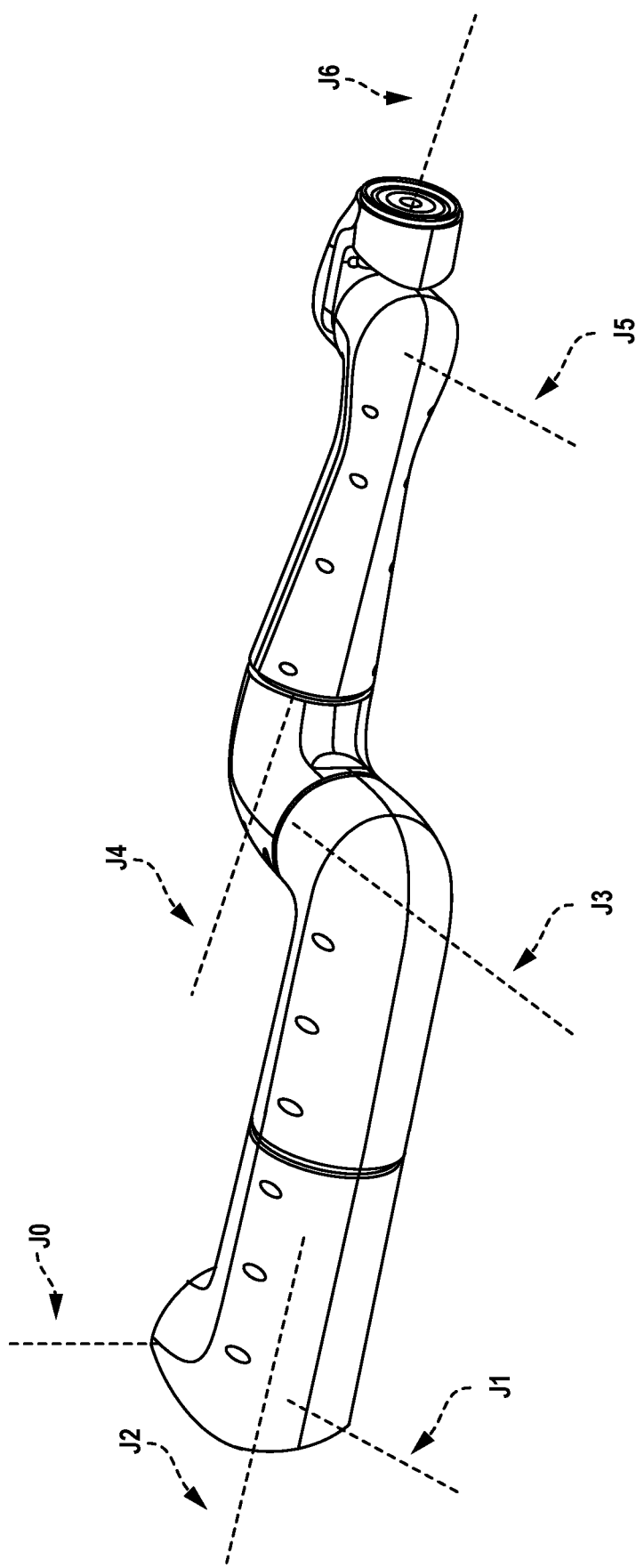
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects.

The wrist roll J6 point is provided instead of two pitch joints in the wrist in order to improve object rotation.

III. EXAMPLE TOUCHED PORTION DETECTION PROCESS

Figure 5A:
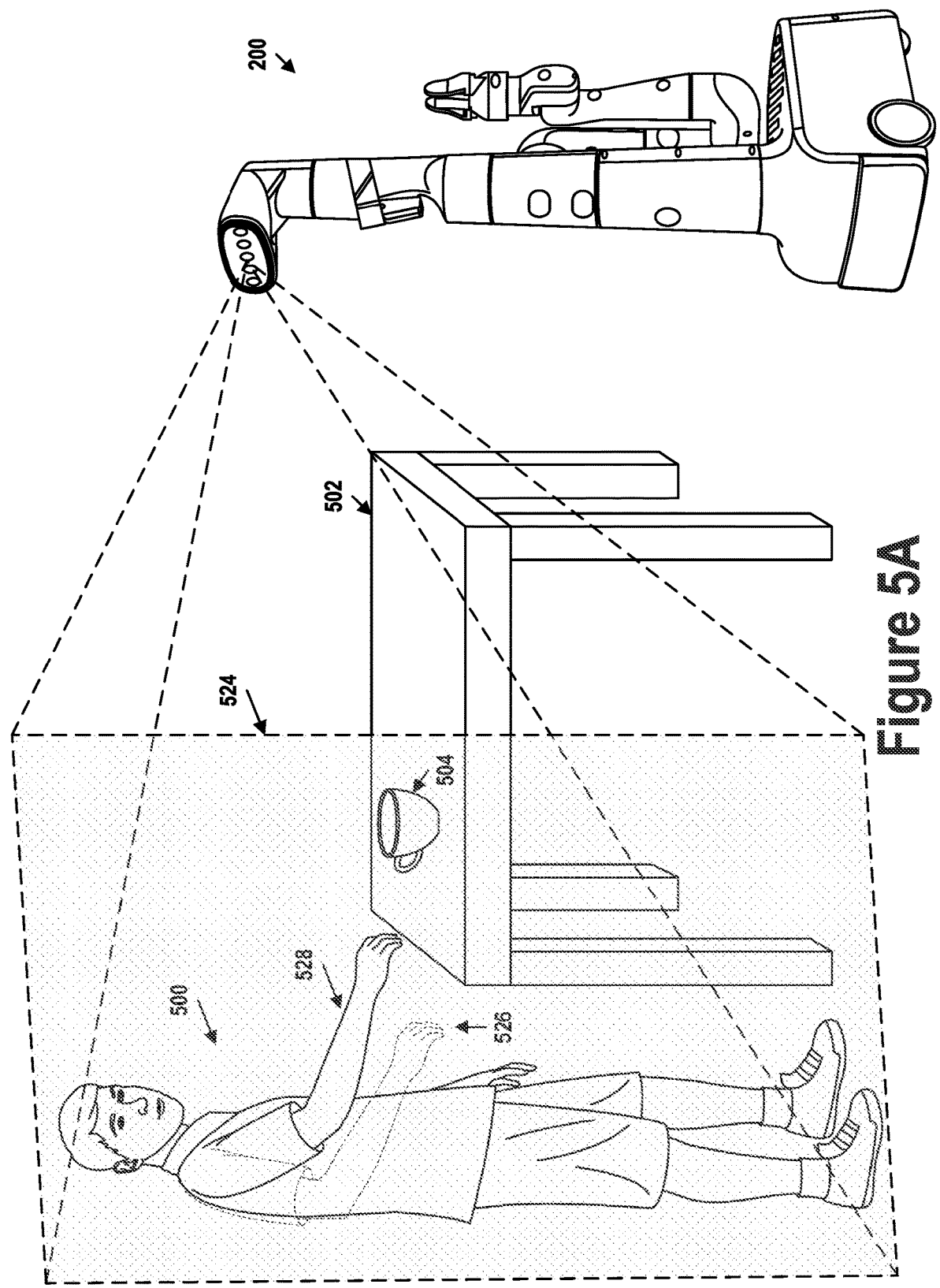
FIG. 5A illustrates an actor interacting with features of an environment, in accordance with example embodiments.

FIGS. 5A, 5B, 5C, and 5D illustrate an example process for detecting touched portions of features of an environment, tracking of the touched portions, and cleaning of the touched portions. Specifically, FIG. 5A illustrates robot 200 obtaining, by way of one or more sensors in perception suite 214, sensor data that represents a region of an environment occupied by actor 500, table 502, and cup 504, as indicated by field of view 524. The right hand of actor 500 is shown moving from pose 526 (indicated with dashed lines) to pose 528 in order to, for example, reach out and grasp cup 504.

While reaching out and/or grasping cup 504, one or more body parts of actor 500 may come into physical contact with a region of table 502. Alternatively or additionally, actor 500 may interact with table 502 for reasons other than picking up an object therefrom, such as by leaning on table 502 for support, and may thus come into physical contact with table 502. In some cases, this contact between actor 500 and table 502 may stain, dirty, and/or otherwise contaminate table 502 with bacteria, viruses, sweat, and/or other unwanted substances that may be transferred from a part (e.g., the right hand) of actor 500 to table 502. Rather than causing robot 200 to indiscriminately clean the entirety of table 502 and/or other features of the environment, robot 200 may instead be configured to identify and clean the specific portions thereof that have been touched and/or appear to have been touched by actor 500.

Figure 5B:
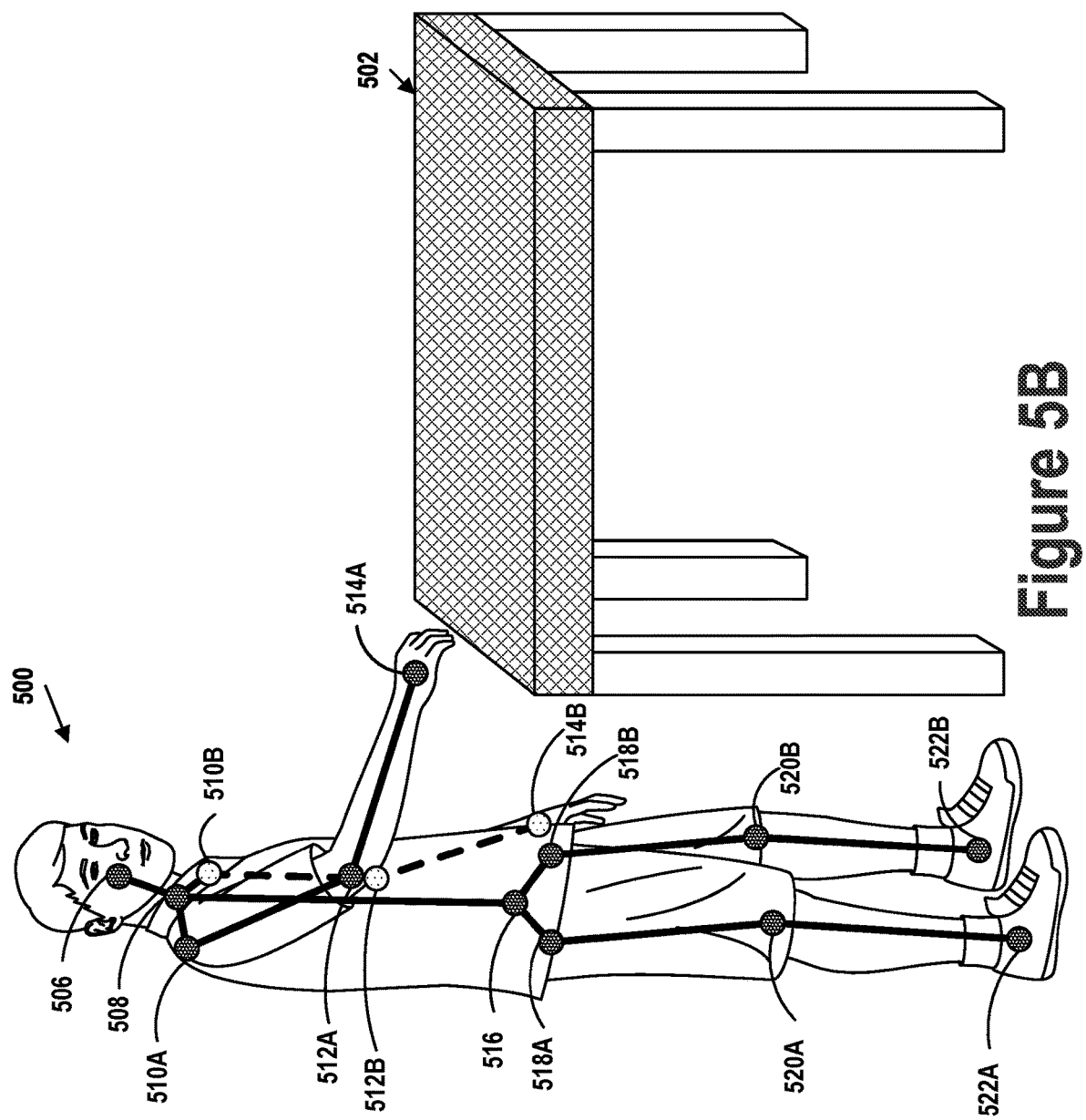
FIG. 5B illustrates keypoints on an actor, in accordance with example embodiments.

To that end, a control system (e.g., control system 118 or similar components) of robot 200 may be configured to process the sensor data (e.g., as represented by field of view 524) to identify therein a plurality of keypoints representing corresponding body locations of a body of actor 500. When actor 500 is a human, the plurality of keypoints may represent predetermined locations on a human body, as shown in FIG. 5B. These predetermined body locations may include head keypoint 506, neck keypoint 508, shoulder keypoints 510A and 510B, elbow keypoints 512A and 512B, hand keypoints 514A and 514B, pelvic keypoint 516, hip keypoints 518A and 518B, knee keypoints 520A and 520B, and foot keypoints 522A and 522B (i.e., keypoints 506-522B). Thus, at least a subset of keypoints 506-522B may include joints of the human body. Keypoints 506-522B may provide an accurate representation of a pose of actor 500, and may be generated and processed with less computational effort than certain other representations, such as a polygonal mesh of actor 500.

In some implementations, some of keypoints 506-522B may be omitted and/or other keypoints may be added. For example, pelvic keypoint 516 may be omitted. In another example, each of hand keypoints 514A and 514B may be further subdivided into five or more keypoints representing the fingers of each hand, among other possibilities. Keypoints 506-522B are shown interconnected to form a virtual human skeleton. Further, keypoints 510B, 512B, and 514B are drawn with a different pattern than the other keypoints (and interconnected with dashed lines) to indicate that keypoints 510B, 512B, and 514B are not visible (i.e., are hidden) when actor 500 is viewed by robot 200 from the perspective shown in FIGS. 5A and 5B.

Alternatively, in some implementations, the plurality of keypoints may represent predetermined locations on a robotic body, or predetermined locations on a body of an actor of a species other than human and which is also capable of interacting with features in the environment (e.g., dog or cat). Thus, the number and positioning of the keypoints may vary according to the type of actor. Further, keypoints 506-522B may alternatively be referred to as nodes. In general, the plurality of keypoints may be predetermined body locations that the control system is configured to attempt to find or identify in captured sensor data.

The control system may be configured to determine that a portion of a particular feature has been touched based on a relative positioning between (i) one or more keypoints of keypoints 506-522B and (ii) the portion of the particular feature. Specifically, the control system may maintain a map of the environment that represents therein at least stationary features of the environment, such as table 502. The stationary features may include landscape features, building fixtures, furniture, the ground/floor, and other physical features. The stationary features may be fixed and/or repositionable, but may generally be expected to remain at a constant position within the environment over a predetermined period of time. In some implementations, the stationary features may include any physical feature of the environment besides any actors present in the environment.

The map of the environment may be generated and/or updated based on sensor data collected by robot 200 as it moves through the environment. For example, in addition to being used to detect actor 500, the sensor data represented by field of view 524 may be used to generate and/or update the map. Additionally or alternatively, the map may be generated and/or updated based on additional sensor data generated by other sensors. For example, the other sensors may be positioned on other robots operating within the environment and/or may be distributed at predetermined locations throughout the environment. Thus, in some cases, the map may be shared by multiple robots operating in the environment. In another example, robot 200 may initially operate based on a predetermined map of the environment. As sensor data is generated over time by various sensors, the predetermined map may be updated based on the sensor data.

Based on the map and the plurality of keypoints, the control system may be configured to identify one or more portions of one or more features of the environment that have come to within a threshold distance of the one or more particular keypoints. Specifically, the respective positions of the one or more particular keypoints of keypoints 506-522B (e.g., hand keypoints 514A and 514B) may be transformed from a reference frame of the sensor (used to generate the sensor data based on which keypoints 506-522B have been identified) to a reference frame of the map of the environment representing the stationary features. Thus, the one or more particular keypoints may be represented as part of the map of the environment, and the distances between the one or more particular keypoints and features of the environment may be directly compared.

FIG. 5C illustrates part of the determination of whether a feature of the environment is within a respective threshold distance of a particular keypoint, and is thus considered to have been touched. Specifically, FIG. 5C illustrates sphere 530 that is centered on right hand keypoint 514A. Radius 532 of sphere 530 may define the threshold distance relative to right hand keypoint 514A. Any portions of the stationary features that fall within the volume of sphere 530 may be deemed to have been touched by actor 500.

As shown in FIG. 5C, a portion of table 502 intersects with the volume of sphere 530. Accordingly, FIG. 5D illustrates that portion 534 of table 502 has been designated for cleaning by robot 200. Portion 534 is circular in at least one dimension due to the fact that it represents the geometric intersection of the tabletop of table 502 with the volume of sphere 530. Specifically, the map may be updated to indicate that portion 534 is to be cleaned by robot 200. For example, the values of one or more variables (e.g., clean/dirty flag, touched/untouched flag, etc.) associated with portion 534 in the map may be updated to indicate that portion 534 is to be cleaned. In some cases, one or more additional models and/or algorithms may be used to determine whether actor 500 intended to interact with table 502, or whether the intersection between sphere 530 and table 502 is a result of actor 500 passing near the table without engaging with table 502 and/or objects thereon. Such additional models and/or algorithms are illustrated in and discussed in more detail with respect to FIG. 6.

In one example, the map may represent the environment by way of a plurality of voxels. Each voxel may be marked either as occupied by a stationary feature or as unoccupied (e.g., representing empty space). Each voxel may also be associated with a corresponding variable, the value of which may be indicative of a cleanliness of the corresponding portion of the environment. In some cases, the variable may be a binary value, and may thus indicate whether the corresponding portion of the environment is clean or dirty, and/or touched or untouched. In other cases, the variable may take on more than two values, and may thus be configured to indicate various states of cleanliness.

An occupied voxel may be marked for cleaning when at least a portion of the voxel falls within the threshold distance of the particular keypoint (e.g., intersects with sphere 530). Empty voxels may be ignored when determining the intersection with sphere 530 to decrease the amount of computational effort involved. In cases where the "cleanliness" variable may take on more than two values, the value of the variable may be based on the extent of intersection between the voxel and the sphere. For example, a voxel positioned entirely within the threshold distance may be marked as "very dirty," a voxel positioned partially within the threshold distance may be marked as "moderately dirty," and a voxel positioned entirely outside of the threshold distance may be marked as "clean."

In other examples, the map may represent the environment by way of a polygon mesh that includes vertices, edges, and faces. Thus, for example, features of the environment may be represented as combinations of polygonal faces, rather than voxels. A portion of the polygon mesh may be marked for cleaning based on one or more of the vertices, edges, and/or faces being positioned within the threshold distance. Other arrangements of the map are possible.

In some cases, the map of the environment may associate with each respective stationary feature represented by the map an indication of a touch frequency of the respective feature. For example, a tabletop of table 502 may be classified as a high-touch feature, as indicated by the hashed pattern thereof, while legs of table 502 may be classified as a low-touch feature, as indicated by the absence of patterning thereof. Other classifications and/or values, such as medium-touch, are possible. In some implementations, the touch frequency of a feature may be represented by associating each element of the map (e.g., voxel, polygon face, etc.) with a corresponding touch frequency value. The classification of each stationary feature may be predefined (e.g., by a programmer), determined by a machine learning algorithm, and/or determined based on touch frequencies empirically observed by robot 200.

Accordingly, in some cases, the control system may be configured to identify high-touch features that intersect with sphere 530, but might not identify low-touch features that fall within sphere 530. In other cases, the control system may prioritize identifying and/or cleaning of high-touch features relative to low-touch features. Thus, the amount of computation performed by the control system, and the amount of cleaning carried out by robot 200, may be reduced without significantly reducing the cleanliness of the environment. In further cases, however, both high-touch features and low-touch features may be treated equally by the control system.

Other keypoints of keypoints 506-522B may be associated with corresponding threshold values. Thus, additional spheres may be centered around these other keypoints. For example, another instance of sphere 530 may be centered around left hand keypoint 514B. In some cases, additional keypoints may be used to represent the fingers associated with each hand of actor 500, and each of these additional keypoints may be associated with a corresponding sphere indicative of a corresponding threshold distance. In some cases, the threshold distance associated with the fingers of actor 500 may, due to the different size scale, be different (e.g., smaller) than the threshold distance associated with the hands of actor 500. Similarly, in cases where a further respective threshold distance is provided with respect to the keypoints of other body parts (e.g., feet, elbows, etc.), the further respective threshold distance may be different from those used with respect to the hands and/or fingers.

In some implementations, the value of the threshold distance associated with a particular keypoint may be based on a confidence value associated with the identification/determination of the particular keypoint. For example, a keypoint corresponding to a body location that is explicitly represented (e.g., visible) in the sensor data and/or represented at a relatively high level of detail (e.g., resolution) may be associated with a relatively high confidence value. On the other hand, a keypoint corresponding to another body location that is not represented in the sensor data and/or is represented as a relatively low level of detail may be associated with a relatively low confidence level.

Thus, the threshold distance of a particular keypoint may take on a first value when the particular keypoint is identified with relatively high confidence (e.g., when visible), and may take on a second smaller value when the particular keypoint is identified with a relatively low confidence (e.g., when hidden). The threshold distance value may vary from (i) a maximum threshold value corresponding to a lowest allowable confidence value to (ii) a minimum threshold value corresponding to a maximum confidence value (i.e., 100%). In some cases, the maximum and minimum threshold values may be predefined. Accordingly, the size of the sphere defined by the threshold distance may be increased to account for lower confidence keypoint identifications, thereby resulting in larger portions of the environment being considered "touched" and more surface area being cleaned. Similarly, the size of the sphere defined by the threshold distance may be decreased to account for higher confidence keypoint identifications, thereby resulting in smaller portions of the environment being considered "touched" and less surface area being cleaned.

As actor 500 interacts with the environment, actor 500 may also be determined to have touched other portions of other stationary features within the environment. For example, based on additional sensor data captured at a different point in time (not shown), actor 500 may be determined, using the procedure discussed above, to have touched portion 536 of table 502, as shown in FIG. 5D. Thus, the map may be further updated to indicate that portion 536 is also to be cleaned. Accordingly, the map may be used to represent the environment as well as to keep track of portions of features of the environment that have (likely and/or in fact) been touched, and are thus designated for cleaning by robot 200.

Once actor 500 vacates the area around table 502, and thus provides robot 200 sufficient room to move around table 502, robot 200 may be used to clean portions 534 and 536 of table 502. To that end, robot 200 may include end effector 538 configured to allow for cleaning of portions of the environment. While end effector 538 is shown as a sponge, the end effector may additionally or alternatively include one or more brushes, sprayers (allowing for application or a cleaning agent), illuminators, vacuums, mops, sweepers, wipers, and/or other cleaning implements. In some cases, robot 200 may be equipped with a plurality of different end effectors, and may be configured to select, from the plurality of different end effectors, a particular end effector based on, for example, the type/classification of surface to be cleaned, the extent of cleaning to be performed, and/or an amount of time allowed for the cleaning, among other considerations.

In some implementations, the map of the environment may indicate an extent of uncleanliness of portions of the environment and/or an extent to which the portions of the environment are to be cleaned. Thus, updating the map to indicate that a particular portion of a particular stationary feature is to be cleaned may involve updating the map to indicate an extent of uncleanliness of the portion of the stationary feature and/or an extent to which the portion of the stationary feature is to be cleaned.

In one example, the map may be updated to indicate an extent of uncleanliness of portion 534 based on a distance between portion 534 and keypoint 514A. As keypoint 514A comes closer to portion 534 and/or subregions thereof, the extent of uncleanliness of portion 534 and/or subregions thereof may increase. In another example, the map may be updated to indicate an extent of uncleanliness of portion 534 based on a number of times that portion 534, prior to being cleaned, has been positioned within a respective threshold distance of one or more particular keypoints of keypoints 506-522B. That is, the extent of uncleanliness of portion 534 may be based on a number of times that portion 534 is determined to have been touched, with the extent of uncleanliness increasing as the number of times that portion 534 is determined to have been touched increases.

The map may be updated to keep track of the extent of uncleanliness. For example, each portion and/or subregion thereof represented by the map may be associated with a "cleanliness" variable, which may range, for example, from 0 (clean) to 100 (very dirty), among other possibilities. An extent of cleaning of portion 534 by robot 200 may be based on the extent of uncleanliness of portion 534, with the extent of cleaning increasing as the extent of uncleanliness increases.

Once robot 200 completes cleaning of portions 534 and 536, the corresponding portions of the map may be updated to indicate that portions 534 and 536 have been cleaned. In some cases, the respective times at which portions 534 and 536 have been touched, and the respective times at which portions 534 and 536 have been cleaned may be stored and used to monitor a touch frequency and/or cleaning frequency associated with various features of the environment. For example, a second map used to track the touch frequency of these surfaces may be updated to increase the touch count and cleaning count associated with table 502 by two and/or each of portions 534 and 536 by one. Thus, the relative touch frequency of various features (or portions thereof) of the environment may be determined and used, for example, to determine which features of the environment are considered high-touch and which are considered low-touch.

In addition to or as an alternative to cleaning of portions 534 and 536, robot 200 and/or a computing device associated therewith may be configured to provide one or more visual representations of information collected by robot 200 and/or contained in the map (e.g., touch times, cleaning times, touch extent, etc.). In one example, robot 200 may be equipped with a projector configured to project visual representations onto the environment. Thus, robot 200 may use the projector to project a visual representation of aspects of the map onto the environment. Specifically, different portions of the visual representation of the map may be spatially aligned with corresponding portions of features of the environment. Thus, a given unit of information may be visually overlaid onto a portion of the environment that the given unit of information describes and/or quantifies.

For example, a first portion of the visual representation may be spatially aligned with portion 534 of table 502 to visually indicate that portion 534 is to be cleaned, and a second portion of the visual representation may be spatially aligned with portion 536 of table 502 to visually indicate that portion 536 is to be cleaned. The shape and/or size of the first and second portions of the visual representation may be selected to match a physical shape and/or size of portions 534 and 536. Robot 200 may be configured to determine and apply a keystone correction to the visual representation based on a relative position of the projector and the portions of the features of the environment being illuminated thereby. Such projection of the visual representation of aspects of the map onto the environment may allow actors present within the environment to see aspects of the map overlaid onto the environment. Thus, in some cases, the visual projection may be provided by robot 200 based on and/or in response to detecting the presence of one or more actors in the environment.

In another example, robot 200 and/or the computing device associated therewith may be configured to generate an image that represents the information collected by robot 200 and/or contained in the map. The image may represent the environment from a particular perspective and may include spatially corresponding aspects of the map overlaid thereon. In some implementations, the sensor data captured by robot 200 may include a first image that represents the environment. A second image may be generated by projecting, onto an image space of the first image, aspects of the map. For example, visual representations of portion 534 and portion 536 may be projected onto the image space of the first image to indicate, within the second image, that portion 534 and portion 536 are to be cleaned.

A third image may be generated by inserting into the first image at least a portion of the second image that represents the relevant aspects of the map. Thus, for example, the third image may be generated by inserting into the first image at least the regions of the second image that represent portion 534 and 536 to indicate that portion 534 and 536 of table 502 is to be cleaned. The third image may be displayed, thus allowing aspects of the map to be presented visually. For example, the third image may contain a heatmap that indicates an extent of uncleanliness of portions of the environment, a touch history of portions of the environment, and/or a cleaning history of portions of the environment, among other possibilities. Thus, the third image may be used by actors to assist with cleaning the environment.

IV. EXAMPLE TOUCHED PORTION DETECTION SYSTEM

Figure 6:
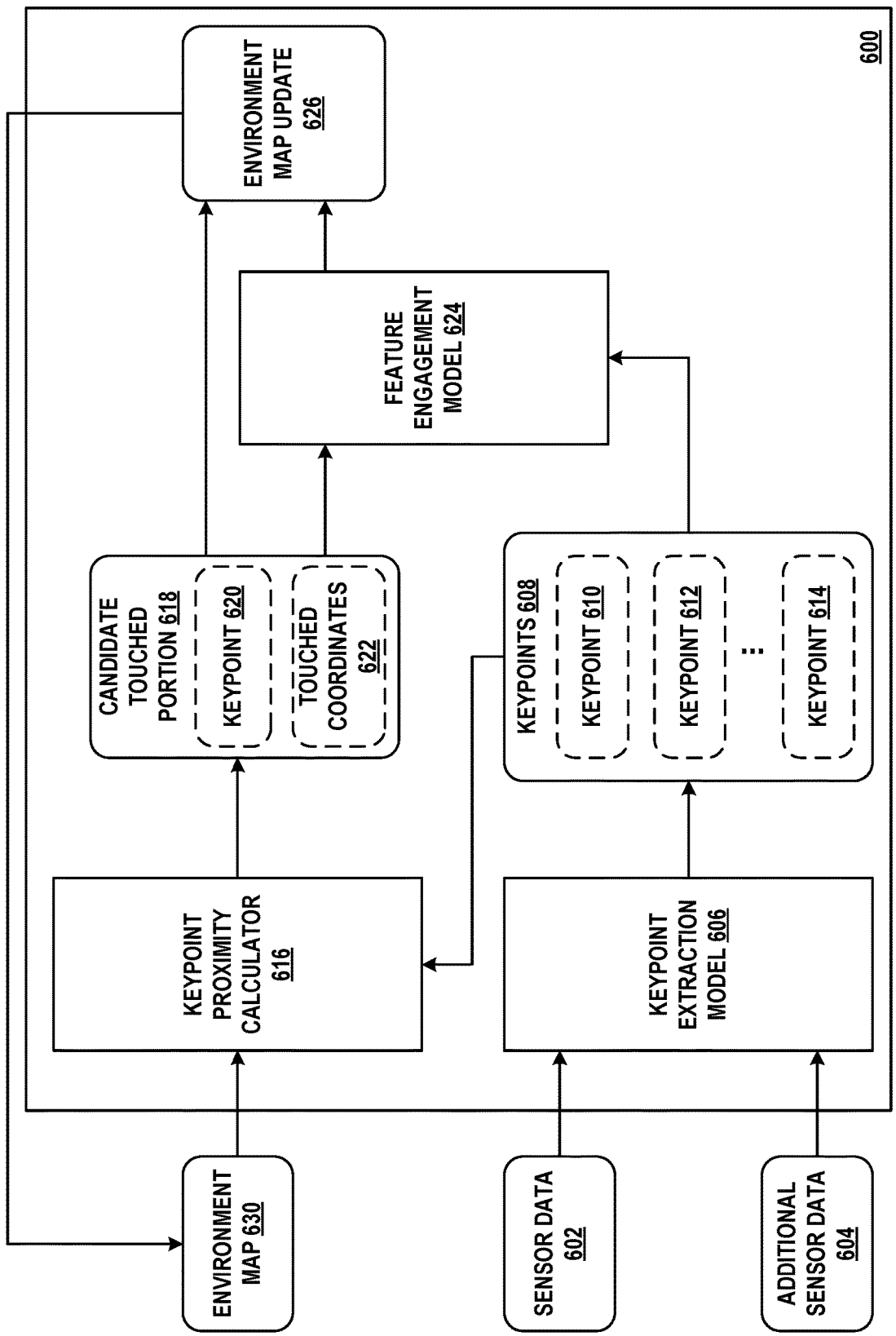
FIG. 6 illustrates a system, in accordance with example embodiments.

FIG. 6 illustrates system 600 which may be configured to identify/determine portions of the environment deemed to have been touched by an actor. Specifically, system 600 includes keypoint extraction model 606, keypoint proximity calculator 616, and feature engagement model 624. Each of model 606, calculator 616, and model 624 may be implemented using hardware components (e.g., purpose-built circuitry), software instructions (e.g., configured to execute on general-purpose circuitry), and/or a combination thereof. In some implementations, system 600 may form a subset of control system 118.

Keypoint extraction model 606 may be configured to identify, based at least on sensor data 602, keypoints 608, which may include keypoint 610 and keypoints 612 through 614 (i.e., keypoints 610-614). Each of keypoints 610-614 may be associated with a corresponding position (e.g., in a reference frame of the sensor data) and, in some cases, a confidence value indicating an accuracy of the corresponding position. Sensor data 602 may be obtained by way of one or more sensors on robot 200 (e.g., as indicated by field of view 524 in FIG. 5A), and keypoints 608 may correspond to keypoints 505-522B shown in FIGS. 5B and 5C.

In some implementations, keypoint extraction model 606 may additionally be configured to determine keypoints 608 based on additional sensor data 604, which may be received from sensors on other robotic devices operating within the environment and/or sensors positioned at fixed locations throughout the environment. Additional sensor data 604 may represent the actor from a different perspective than sensor data 602, and may thus provide additional information regarding the positioning of keypoints 608. Keypoint extraction model 606 may include rule-based algorithms and/or machine learning algorithms/models. For example, keypoint extraction model 606 may include a feed-forward artificial neural network trained, based on a plurality of training sensor data labeled with corresponding keypoints, to identify keypoints 608.

Keypoint proximity calculator 616 may be configured to identify candidate touched portion 618 based on environment map 630 and one or more of keypoints 608. In some cases, keypoint proximity calculator 616 may identify a plurality of candidate touched portions (e.g., a plurality of instances of candidate touched portion 618), although only a single candidate touched portion 618 is shown for clarity of illustration. Touched coordinates 622 of candidate touched portion 618 may represent a portion of a stationary feature that is represented by environment map 630 and falls within a respective threshold distance of keypoint 620. Thus, touched coordinates 622 may define an area and/or volume within environment map 630 determined to have been touched. Keypoint 620 may represent a particular one of keypoints 608 (e.g., keypoint 612), and may be associated with a body location that is commonly used to interact and/or touch surfaces (e.g., fingers, hands, arms, etc.).

Since some of keypoints 610-614 may be associated with body locations that might not be commonly used to touch and/or interact with features of the environment, keypoint proximity calculator 616 may, in some cases, ignore such keypoints when identifying candidate touched portion 618. In other cases, however, keypoint proximity calculator 616 may be configured to consider each of keypoints 610-614 when identifying candidate touched portion 618. Keypoint proximity calculator 616 may be configured to apply, to each respective keypoint of keypoints 610-614, a corresponding threshold distance depending on the body location represented by the respective keypoint and/or a confidence value associated with the estimated position of the respective keypoint.

Keypoint proximity calculator 616 may be configured to transform the respective positions of one or more of keypoints 608 (e.g., keypoint 612) from the reference frame of the sensor data to the reference frame of environment map 630. Further, keypoint proximity calculator 616 may be configured to identify intersections between stationary features represented by environment map 630 and respective threshold distance "spheres" associated with the one or more of keypoints 608. Thus, candidate touched portion 618 may indicate a region of the environment that has likely been touched by an actor, and is thus a candidate for cleaning by robot 200.

In some implementations, feature engagement model 624 may be omitted from system 600. Thus, candidate touched portion 618 may constitute environment map update 626, since touched coordinates 622 may identify the regions of environment map 630 that are to be cleaned. In other implementations, feature engagement model 624 may be configured to perform further processing to validate and/or verify the accuracy of candidate touched portion 618. Specifically, feature engagement model 624 may be configured to determine whether keypoints 608 indicate that the actor is engaged with or disengaged from the feature of the environment associated with candidate touched portion 618, thus serving as a validation/verification for the output of keypoint proximity calculator 616.

In one example, feature engagement model 624 may be configured to determine an extent of engagement between (i) the actor represented by keypoints 608 and (ii) candidate touched portion 618 and/or the underlying feature of the environment. For example, feature engagement model 624 may be trained to determine whether the actor is engaged with, neutral with respect to, or disengaged from candidate touched portion 618. The relative position of keypoints 608 with respect to one another and with respect to candidate touched portion 618 may provide cues indicative of the extent of engagement. Through, for example, a supervised training process, feature engagement model 624 may be configured to determine the extent of engagement based on these cues. Accordingly, feature engagement model 624 may include one or more machine learning models trained to determine the extent of engagement between the actor and portion 618.

In another example, feature engagement model 624 may be configured to determine the extent of engagement further based on a motion pattern of the actor over time. For example, feature engagement model 624 may be configured to consider keypoints 608 associated with the most recent sensor data, as well as keypoints extracted from sensor data received at one or more earlier times, in order to determine the extent of engagement. Specifically, the motion pattern of the actor over time may provide additional cues indicative of the extent of engagement of the actor with candidate touched portion 618. Thus, feature engagement model 624 may include one or more time-based machine learning models, such as recurrent neural networks or long-short term memory (LSTM) neural networks, trained to determine the extent of engagement based on temporal sequences of keypoints.

When feature engagement model 624 determines that the actor is engaged with portion 618 and/or the underlying feature of the environment (e.g., when the extent of engagement determined by feature engagement model 624 exceeds a threshold engagement value), candidate touched portion 618 may be used to generate environment map update 626. That is, environment map update 626 may indicate that touched coordinates 622 are to be cleaned by robot 200. Feature engagement model 624 may thus signal that candidate touched portion 618 is a true positive resulting from the actor interacting with candidate touched portion 618.

When feature engagement model 624 determines that the actor is not engaged with portion 618 and/or the underlying feature of the environment (e.g., when the extent of engagement determined by feature engagement model 624 does not exceed the threshold engagement value), candidate touched portion 618 may instead be discarded. That is, environment map update 626 might not be generated based on candidate touched portion 618. Feature engagement model 624 may thus signal that candidate touched portion 618 is a false positive resulting from a body location of the actor coming within the corresponding threshold distance of the feature, but without the actor actually interacting with candidate touched portion 618.

Feature engagement model 624 may thus assist with distinguishing (i) cases where a body part of the actor is positioned sufficiently close to a feature to cause generation of candidate touched portion 618 but does not actually interact with the feature from (ii) cases where the actor positions a body part close to and/or in contact with the feature as part of a physical interaction with the feature. Thus, feature engagement model 624 may distinguish between, for example, (i) actor 500 of FIG. 5A walking close by to table 502 without interacting therewith and (ii) actor 500 picking cup 504 off of table 502 or otherwise interacting with table 502.

Additionally, by using keypoint proximity calculator 616 in combination with feature engagement model 624, the computational cost associated with system 600 and/or the amount of cleaning carried out by robot 200 may be reduced and/or minimized. Specifically, by executing feature engagement model 624 with respect to candidate touched portion 618, rather than with respect to any stationary features present in the environment, the amount of processing performed by feature engagement model 624 may be reduced and/or minimized. Since features that do not come with the respective threshold distance of the one or more keypoints of keypoints 608 are unlikely to have been touched by the actor, the extent of engagement between the actor and these features may be irrelevant for the purpose of cleaning the environment. Thus, omitting the determination of the extent of engagement with features that are not nearby the actor may result in fewer executions of feature engagement model 624. Similarly, by using feature engagement model 624 to identify false positive candidate touched portions, robot 200 may focus on cleaning portions of the environment that the actor likely engaged with, and avoid cleaning portions of the environment that the actor likely did not engage with.

In some implementations, robot 200 might not be used to monitor and/or clean the environment. For example, the sensor data used to detect touched surfaces may be received from a sensor positioned at a fixed location within the environment, and the cleaning may be carried out by a human actor. Specifically, the human actor may use a visualization of the map and the portions thereof to be cleaned to carry out a more focused cleaning process. Such an approach may be used, for example, in environments where a robotic device might not be able to fit and/or operate, such as inside a vehicle. Specifically, the system may be used to track surfaces touched by a passenger of the vehicle, and the map may be used by a driver and/or operator of the vehicle to clean the surfaces touched by the passenger.

V. ADDITIONAL EXAMPLE OPERATIONS

Figure 7:
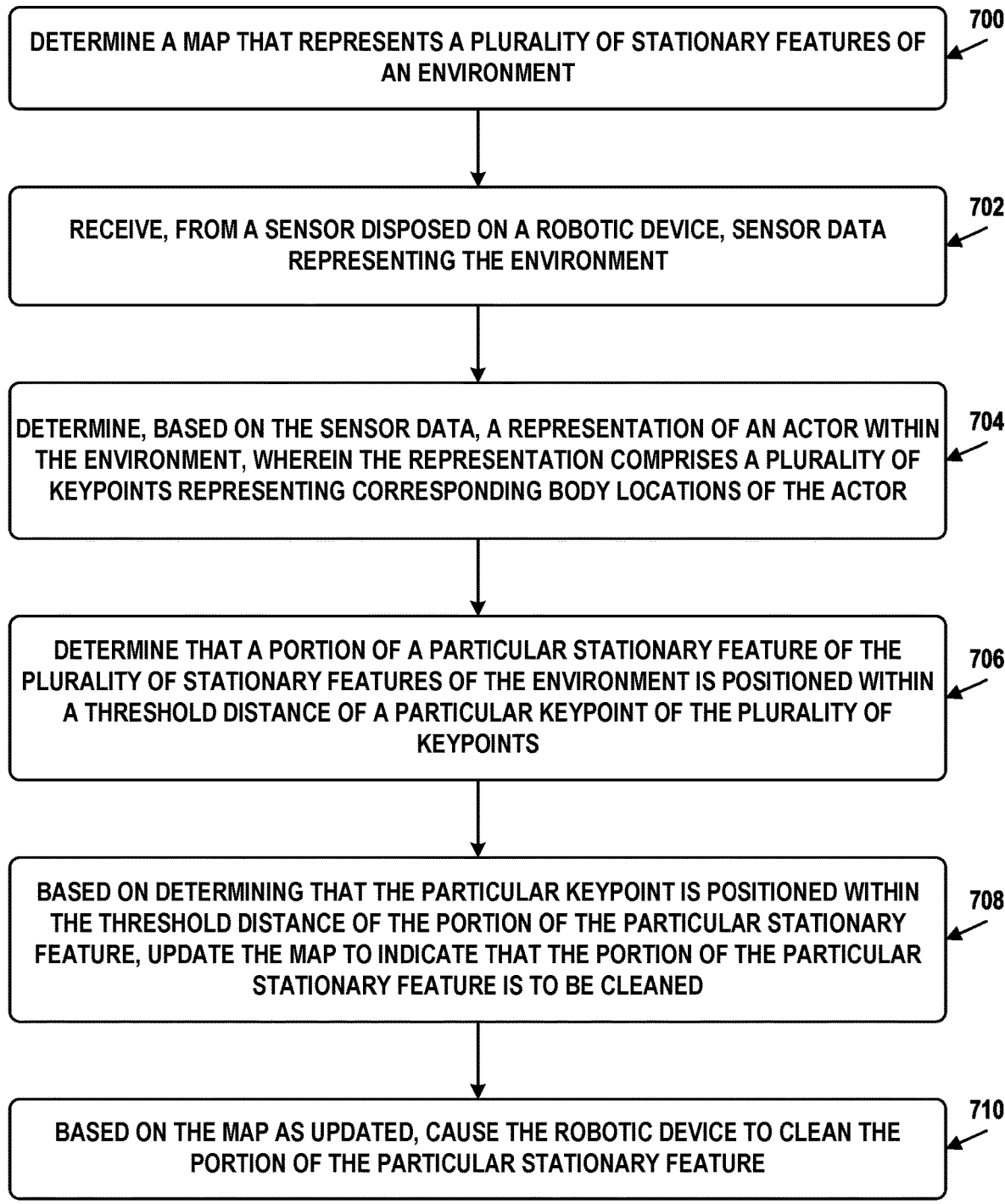
FIG. 7 illustrates a flow chart, in accordance with example embodiments.

FIG. 7 illustrates a flow chart of operations related to identifying portions of the environment to be cleaned, tracking these portions, and cleaning these portions by a robot. The operations may be carried out by robotic system 100, robot 200, and/or system 600, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may include determining a map that represents a plurality of stationary features of an environment.

Block 702 may include receiving, from a sensor disposed on a robotic device, sensor data representing the environment.

Block 704 may include determining, based on the sensor data, a representation of an actor within the environment. The representation may include a plurality of keypoints representing corresponding body locations of the actor.

Block 706 may include determining that a portion of a particular stationary feature of the plurality of stationary features of the environment is positioned within a threshold distance of a particular keypoint of the plurality of keypoints.

Block 708 may include, based on determining that the particular keypoint is positioned within the threshold distance of the portion of the particular stationary feature, updating the map to indicate that the portion of the particular stationary feature is to be cleaned.

Block 710 may include, based on the map as updated, causing the robotic device to clean the portion of the particular stationary feature.

In some embodiments, the plurality of keypoints may represent an arm of the actor, and the particular keypoint may represent a hand of the actor.

In some embodiments, determining the representation of the actor may include determining the plurality of keypoints by way of a machine learning model trained to identify the plurality of keypoints within the sensor data representing the actor, and mapping locations of the plurality of keypoints from a reference frame of the sensor data to a reference frame of the map.

In some embodiments, the map may include a plurality of voxels. Determining that the particular keypoint of the plurality of keypoints is positioned within the threshold distance of the portion of the particular stationary feature may include determining one or more voxels of the plurality of voxels that (i) represent the particular stationary feature and (ii) are positioned within the threshold distance of the particular keypoint.

In some embodiments, based on the robotic device cleaning the portion of the particular stationary feature, the map may be updated to indicate that the portion of the particular stationary feature has been cleaned.

In some embodiments, a subset of the plurality of stationary features may be determined, where each respective stationary feature of the subset is associated with a touch frequency that exceeds a threshold frequency. The subset may include the particular stationary feature. Based on determining the subset of the plurality of stationary features, it may be determined, for each respective stationary feature of the subset, whether one or more portions of the respective stationary feature are positioned within the threshold distance of the particular keypoint. Based on determining whether the one or more portions of the respective stationary feature are positioned within the threshold distance of the particular keypoint, it may be determined that the portion of the particular stationary feature is positioned within the threshold distance of the particular keypoint.

In some embodiments, determining the map may include receiving, from the sensor and while the robotic device moves through the environment, additional sensor data representing one or more of the plurality of stationary features of the environment, and generating the map based on the additional sensor data.

In some embodiments, determining the map may include receiving, from one or more other sensors disposed on one or more other robotic devices and while the one or more other robotic devices move through the environment, additional sensor data representing one or more of the plurality of stationary features of the environment, and generating the map based on the additional sensor data.

In some embodiments, based on relative positions of keypoints of the plurality of keypoints, it may be determined that the actor is engaged with the particular stationary feature. The map may be updated to indicate that the portion of the particular stationary feature is to be cleaned additionally based on determining that the actor is engaged with the particular stationary feature.

In some embodiments, the sensor data may include a plurality of sensor data frames representing the actor within the environment at a plurality of different time points. Based on the plurality of sensor data frames, a plurality of representations of the actor corresponding to the plurality of different time points may be determined. Based on the plurality of representations of the actor, a motion pattern of the actor may be determined. It may be determined that the motion pattern of the actor indicates a contact between the actor and the particular stationary feature. The map may be updated to indicate that the portion of the particular stationary feature is to be cleaned additionally based on determining that the motion pattern of the actor indicates the contact between the actor and the particular stationary feature.

In some embodiments, additional sensor data representing the actor within the environment may be received from an additional sensor positioned within the environment. The additional sensor data may represent the actor from a different perspective than the sensor data. The representation of the actor may be determined further based on the additional sensor data.

In some embodiments, the body location corresponding to the particular keypoint may be occluded within the sensor data. Determining the representation of the actor may include determining a position of the particular keypoint within the environment based on unoccluded body locations of the actor.

In some embodiments, when the body location corresponding to the particular keypoint is unoccluded within the sensor data, the threshold distance may have a first value, and when the body location corresponding to the particular keypoint is occluded within the sensor data, the threshold distance may have a second value larger than the first value.

In some embodiments, updating the map may include updating the map to indicate a touch time at which the portion of the particular stationary feature has been indicated to be cleaned. The map may be further configured to be updated to indicate a cleaning time at which the portion of the particular stationary feature has been cleaned by the robotic device.

In some embodiments, a projector may be connected to the robotic device. A visual representation of the map as updated may be projected, using the projector, onto the environment. A portion of the visual representation of the map may be spatially aligned with the portion of the particular stationary feature to visually indicate that the portion of the particular stationary feature is to be cleaned.

In some embodiments, the sensor data representing the environment may include a first image representing the environment. A second image may be generated by projecting, onto image space of the first image, the map as updated to indicate, within the second image, that the portion of the particular stationary feature is to be cleaned. A third image may be generated by inserting into the first image at least a portion of the second image that indicates that the portion of the particular stationary feature is to be cleaned. The third image may be displayed.

In some embodiments, updating the map to indicate that the portion of the particular stationary feature is to be cleaned may include updating the map to indicate an extent of uncleanliness of the portion of the stationary feature based on one or more of: (i) a distance between the portion of the particular stationary feature and the particular keypoint or (ii) a number of times that the portion of the particular stationary feature has been positioned within a respective threshold distance of one or more keypoints of the plurality of keypoints. An extent of cleaning of the portion of the particular stationary feature by the robotic device may be based on the extent of uncleanliness of the portion of the stationary feature.

Figure 8:
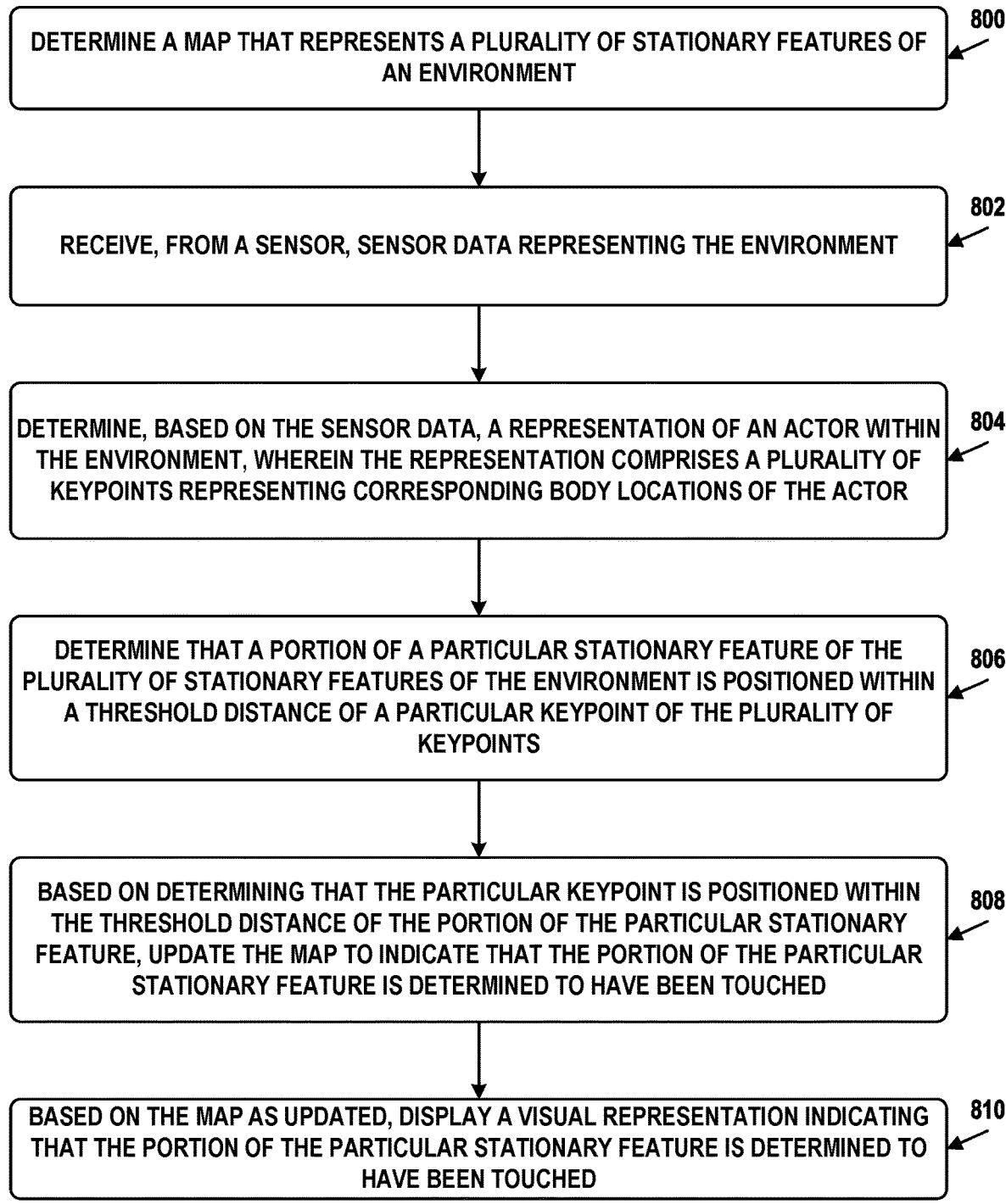
FIG. 8 illustrates a flow chart, in accordance with example embodiments.

FIG. 8 illustrates a flow chart of operations related to identifying portions of the environment determined to have been touched, tracking these portions, and displaying visual representations of these portions. The operations may be carried out by robotic system 100, robot 200, and/or system 600, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may include determining a map that represents a plurality of stationary features of an environment.

Block 802 may include receiving, from a sensor, sensor data representing the environment. In some implementations, the sensor may be disposed on a robotic device.

Block 804 may include determining, based on the sensor data, a representation of an actor within the environment. The representation may include a plurality of keypoints representing corresponding body locations of the actor.

Block 806 may include determining that a portion of a particular stationary feature of the plurality of stationary features of the environment is positioned within a threshold distance of a particular keypoint of the plurality of keypoints.

Block 808 may include, based on determining that the particular keypoint is positioned within the threshold distance of the portion of the particular stationary feature, updating the map to indicate that the portion of the particular stationary feature is determined to have been touched. Determining that the portion of the particular stationary feature has been touched may include determining that the portion appears, based on the sensor data, to have been touched, and/or determining that the portion was in fact physically touched.

Block 810 may include, based on the map as updated, displaying a visual representation indicating that the portion of the particular stationary feature is determined to have been touched. The visual representation may be an image, a video, and/or a projection thereof onto the environment, among other possibilities.

In some embodiments, the plurality of keypoints may represent an arm of the actor, and the particular keypoint may represent a hand of the actor.

In some embodiments, determining the representation of the actor may include determining the plurality of keypoints by way of a machine learning model trained to identify the plurality of keypoints within the sensor data representing the actor, and mapping locations of the plurality of keypoints from a reference frame of the sensor data to a reference frame of the map.

In some embodiments, the map may include a plurality of voxels. Determining that the particular keypoint of the plurality of keypoints is positioned within the threshold distance of the portion of the particular stationary feature may include determining one or more voxels of the plurality of voxels that (i) represent the particular stationary feature and (ii) are positioned within the threshold distance of the particular keypoint.

In some embodiments, a robotic device may be caused, based on the map as updated, to clean the portion of the particular stationary feature.

In some embodiments, based on the robotic device cleaning the portion of the particular stationary feature, the map may be updated to indicate that the portion of the particular stationary feature has been cleaned.

In some embodiments, an additional visual representation may be displayed to indicate that the portion of the particular stationary feature has been cleaned.

In some embodiments, a subset of the plurality of stationary features may be determined, where each respective stationary feature of the subset is associated with a touch frequency that exceeds a threshold frequency. The subset may include the particular stationary feature. Based on determining the subset of the plurality of stationary features, it may be determined, for each respective stationary feature of the subset, whether one or more portions of the respective stationary feature are positioned within the threshold distance of the particular keypoint. Based on determining whether the one or more portions of the respective stationary feature are positioned within the threshold distance of the particular keypoint, it may be determined that the portion of the particular stationary feature is positioned within the threshold distance of the particular keypoint.

In some embodiments, determining the map may include receiving, from the sensor, additional sensor data representing one or more of the plurality of stationary features of the environment, and generating the map based on the additional sensor data.

In some embodiments, determining the map may include receiving, from one or more other sensors disposed on one or more robotic devices and while the one or more robotic devices move through the environment, additional sensor data representing one or more of the plurality of stationary features of the environment, and generating the map based on the additional sensor data.

In some embodiments, based on relative positions of keypoints of the plurality of keypoints, it may be determined that the actor is engaged with the particular stationary feature. The map may be updated to indicate that the portion of the particular stationary feature is determined to have been touched additionally based on determining that the actor is engaged with the particular stationary feature.

In some embodiments, the sensor data may include a plurality of sensor data frames representing the actor within the environment at a plurality of different time points. Based on the plurality of sensor data frames, a plurality of representations of the actor corresponding to the plurality of different time points may be determined. Based on the plurality of representations of the actor, a motion pattern of the actor may be determined. It may be determined that the motion pattern of the actor indicates a contact between the actor and the particular stationary feature. The map may be updated to indicate that the portion of the particular stationary feature is determined to have been touched additionally based on determining that the motion pattern of the actor indicates the contact between the actor and the particular stationary feature.

In some embodiments, additional sensor data representing the actor within the environment may be received from an additional sensor positioned within the environment. The additional sensor data may represent the actor from a different perspective than the sensor data. The representation of the actor may be determined further based on the additional sensor data.

In some embodiments, the body location corresponding to the particular keypoint may be occluded within the sensor data. Determining the representation of the actor may include determining a position of the particular keypoint within the environment based on unoccluded body locations of the actor.

In some embodiments, when the body location corresponding to the particular keypoint is unoccluded within the sensor data, the threshold distance may have a first value, and when the body location corresponding to the particular keypoint is occluded within the sensor data, the threshold distance may have a second value larger than the first value.

In some embodiments, updating the map may include updating the map to indicate a touch time at which the portion of the particular stationary feature is determined to have been touched.

In some embodiments, the map may be further configured to be updated to indicate a cleaning time at which the portion of the particular stationary feature has been cleaned by a robotic device.

In some embodiments, a projector may be configured to project the visual representation onto the environment. A portion of the visual representation may be spatially aligned with the portion of the particular stationary feature to visually indicate that the portion of the particular stationary feature is determined to have been touched.

In some embodiments, the sensor data representing the environment may include a first image representing the environment. A second image may be generated by projecting, onto an image space of the first image, the map as updated to indicate, within the second image, that the portion of the particular stationary feature is determined to have been touched. The visual representation (e.g., a third image) may be generated by inserting into the first image at least a portion of the second image that indicates that the portion of the particular stationary feature is determined to have been touched.

In some embodiments, updating the map to indicate that the portion of the particular stationary feature is determined to have been touched may include updating the map to indicate an extent to which the portion of the stationary feature has been touched based on one or more of: (i) a distance between the portion of the particular stationary feature and the particular keypoint or (ii) a number of times that the portion of the particular stationary feature has been positioned within a respective threshold distance of one or more keypoints of the plurality of keypoints. An extent of cleaning of the portion of the particular stationary feature may be based on the extent to which the portion of the stationary feature has been touched.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   determining a map that represents a plurality of stationary features of an environment;
   receiving, from a sensor, sensor data representing the environment;
   determining, based on the sensor data, a representation of an actor within the environment, wherein the representation comprises a plurality of keypoints representing corresponding body locations of the actor;
   determining that a portion of a particular stationary feature of the plurality of stationary features of the environment is positioned within a threshold distance of a particular keypoint of the plurality of keypoints;
   based on determining that the particular keypoint is positioned within the threshold distance of the portion of the particular stationary feature, updating the map to indicate that the portion of the particular stationary feature is determined to have been touched; and
   based on the map as updated, providing an output indicating that the portion of the particular stationary feature is determined to have been touched.

2. The computer-implemented method of claim 1, wherein providing the output comprises:
   displaying a visual representation indicating that the portion of the particular stationary feature is determined to have been touched.

3. The computer-implemented method of claim 1, wherein providing the output comprises:
   projecting, by a projector and onto the environment, a visual representation indicating that the portion of the particular stationary feature is determined to have been touched, wherein a portion of the visual representation is spatially aligned with the portion of the particular stationary feature to visually indicate that the portion of the particular stationary feature is determined to have been touched.

4. The computer-implemented method of claim 1, wherein the sensor data representing the environment comprises a first image that represents the environment, and wherein providing the output comprises:

generating a second image by projecting, onto an image space of the first image, the map as updated to indicate, within the second image, that the portion of the particular stationary feature is determined to have been touched;

generating a third image by inserting into the first image at least a portion of the second image that indicates that the portion of the particular stationary feature is determined to have been touched; and displaying the third image.

5. The computer-implemented method of claim 1, wherein the plurality of keypoints represents an arm of the actor, and wherein the particular keypoint represents a hand of the actor.

6. The computer-implemented method of claim 1, wherein determining the representation of the actor comprises:

determining the plurality of keypoints by way of a machine learning model that has been trained to identify the plurality of keypoints within the sensor data representing the actor; and mapping locations of the plurality of keypoints from a reference frame of the sensor data to a reference frame of the map.

7. The computer-implemented method of claim 1, wherein the map comprises a plurality of voxels, and wherein determining that the particular keypoint of the plurality of keypoints is positioned within the threshold distance of the portion of the particular stationary feature comprises:

determining one or more voxels of the plurality of voxels that (i) represent the particular stationary feature and (ii) are positioned within the threshold distance of the particular keypoint.

8. The computer-implemented method of claim 1, further comprising:

based on the map as updated, generating a request for cleaning of the portion of the particular stationary feature;

based on the portion of the particular stationary feature being cleaned, updating the map to indicate that the portion of the particular stationary feature has been cleaned; and providing an additional output indicating that the portion of the particular stationary feature has been cleaned.

9. The computer-implemented method of claim 8, wherein updating the map to indicate that the portion of the particular stationary feature has been cleaned comprises:

updating the map to indicate a cleaning time at which the portion of the particular stationary feature has been cleaned.

10. The computer-implemented method of claim 1, wherein determining that the portion of the particular stationary feature is positioned within the threshold distance of the particular keypoint comprises:

determining a subset of the plurality of stationary features, wherein each respective stationary feature of the subset is associated with a touch frequency that exceeds a threshold frequency, and wherein the subset comprises the particular stationary feature;

based on determining the subset of the plurality of stationary features, determining, for each respective stationary feature of the subset, whether one or more portions of the respective stationary feature are positioned within the threshold distance of the particular keypoint; and based on determining whether the one or more portions of the respective stationary feature are positioned within the threshold distance of the particular keypoint, determining that the portion of the particular stationary feature is positioned within the threshold distance of the particular keypoint.

11. The computer-implemented method of claim 1, determining the map comprises:

receiving, from the sensor, additional sensor data representing one or more of the plurality of stationary features of the environment; and generating the map based on the additional sensor data.

12. The computer-implemented method of claim 1, further comprising:

determining, based on relative positions of keypoints of the plurality of keypoints, that the actor is engaged with the particular stationary feature, wherein the map is updated to indicate that the portion of the particular stationary feature is determined to have been touched additionally based on determining that the actor is engaged with the particular stationary feature.

13. The computer-implemented method of claim 1, wherein the sensor data comprises a plurality of sensor data frames representing the actor within the environment at a plurality of different time points, and wherein the method further comprises:

determining, based on the plurality of sensor data frames, a plurality of representations of the actor corresponding to the plurality of different time points;

determining, based on the plurality of representations of the actor, a motion pattern of the actor; and determining that the motion pattern of the actor indicates a contact between the actor and the particular stationary feature, wherein the map is updated to indicate that the portion of the particular stationary feature is determined to have been touched additionally based on determining that the motion pattern of the actor indicates the contact between the actor and the particular stationary feature.

14. The computer-implemented method of claim 1, wherein the body location corresponding to the particular keypoint is occluded within the sensor data, and wherein determining the representation of the actor comprises:

determining a position of the particular keypoint within the environment based on unoccluded body locations of the actor.

15. The computer-implemented method of claim 1, wherein, when the body location corresponding to the particular keypoint is unoccluded within the sensor data, the threshold distance has a first value, and wherein, when the body location corresponding to the particular keypoint is occluded within the sensor data, the threshold distance has a second value larger than the first value.

16. The computer-implemented method of claim 1, wherein updating the map comprises:

updating the map to indicate a touch time at which the portion of the particular stationary feature is determined to have been touched.

17. The computer-implemented method of claim 1, wherein updating the map comprises:

updating the map to indicate an extent to which the portion of the particular stationary feature has been touched based on one or more of: (i) a distance between the portion of the particular stationary feature and the particular keypoint or (ii) a number of times that the portion of the particular stationary feature has been positioned within a respective threshold distance of one or more keypoints of the plurality of keypoints, wherein an extent of cleaning of the portion of the particular stationary feature is based on the extent to which the portion of the stationary feature has been touched.

18. A system comprising:

a sensor; and circuitry configured to perform operations comprising:

determining a map that represents a plurality of stationary features of an environment;

receiving, from the sensor, sensor data representing the environment;

determining, based on the sensor data, a representation of an actor within the environment, wherein the representation comprises a plurality of keypoints representing corresponding body locations of the actor;

determining that a portion of a particular stationary feature of the plurality of stationary features of the environment is positioned within a threshold distance of a particular keypoint of the plurality of keypoints;

based on determining that the particular keypoint is positioned within the threshold distance of the portion of the particular stationary feature, updating the map to indicate that the portion of the particular stationary feature is determined to have been touched; and based on the map as updated, providing an output indicating that the portion of the particular stationary feature is determined to have been touched.

19. The system of claim 18, wherein providing the output comprises:

displaying a visual representation indicating that the portion of the particular stationary feature is determined to have been touched.

20. A non-transitory computer-readable medium having stored thereon instructions that, when executed by a computing device, cause the computing device to perform operations comprising:

determining a map that represents a plurality of stationary features of an environment;

receiving, from a sensor, sensor data representing the environment;

determining, based on the sensor data, a representation of an actor within the environment, wherein the representation comprises a plurality of keypoints representing corresponding body locations of the actor;

determining that a portion of a particular stationary feature of the plurality of stationary features of the environment is positioned within a threshold distance of a particular keypoint of the plurality of keypoints;

based on determining that the particular keypoint is positioned within the threshold distance of the portion of the particular stationary feature, updating the map to indicate that the portion of the particular stationary feature is determined to have been touched; and based on the map as updated, providing an output indicating that the portion of the particular stationary feature is determined to have been touched.

* * * * *